United States Patent
Gotou et al.

(10) Patent No.: US 10,841,669 B2
(45) Date of Patent: Nov. 17, 2020

(54) BATTERY MANAGEMENT DEVICE, BATTERY MANAGEMENT SYSTEM, AND BATTERY MANAGEMENT METHOD

(71) Applicant: Yokogawa Electric Corporation, Tokyo (JP)

(72) Inventors: Hirotsugu Gotou, Tokyo (JP); Hiroaki Kanokogi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 140 days.

(21) Appl. No.: 15/962,095

(22) Filed: Apr. 25, 2018

(65) Prior Publication Data

US 2018/0316988 A1  Nov. 1, 2018

(30) Foreign Application Priority Data

Apr. 28, 2017  (JP) ................ 2017-090722

(51) Int. Cl.
  *H04Q 9/00* (2006.01)
  *H02J 7/00* (2006.01)
  *H02J 13/00* (2006.01)
(52) U.S. Cl.
  CPC ........... *H04Q 9/00* (2013.01); *H02J 7/0047* (2013.01); *H02J 7/0063* (2013.01); *H02J 13/0003* (2013.01); *H02J 2007/0067* (2013.01); *H04Q 2209/883* (2013.01)
(58) Field of Classification Search
  CPC ....... H04Q 9/00; H02J 7/0047; H02J 7/0063; H02J 13/0003; G08B 25/10; G08B 25/009
  USPC .................................................. 709/223
  See application file for complete search history.

(56) References Cited

U.S. PATENT DOCUMENTS

| 7,109,875 | B2* | 9/2006 | Ota ................ G08B 25/009 320/132 |
| 8,624,729 | B2* | 1/2014 | Preden .................... H04Q 9/00 340/539.17 |
| 10,375,457 | B2* | 8/2019 | Bender ................... H04Q 9/00 |
| 2007/0198675 | A1* | 8/2007 | Amanuddin .......... G08B 25/10 709/223 |
| 2008/0299915 | A1* | 12/2008 | Fink ...................... G08C 17/02 455/90.1 |
| 2013/0188557 | A1 | 7/2013 | Gotou |
| 2013/0267164 | A1 | 10/2013 | Kodama et al. |

(Continued)

FOREIGN PATENT DOCUMENTS

| DE | 10 2015 117 010 A1 | 4/2017 |
| EP | 1 906 286 A1 | 4/2008 |
| JP | 2013-152538 A | 8/2013 |

(Continued)

*Primary Examiner* — Albert K Wong
(74) *Attorney, Agent, or Firm* — Sughrue Mion, PLLC

(57) ABSTRACT

A battery management device according to one aspect of the present invention for managing a plurality of field devices of a battery-driven type, the plurality of field devices being associated with a facility disposed in a plant and being defined as belonging to a same group includes a battery manager that, in a case receiving battery life information representing approach to a battery life of an installed battery from a first field device that is one field device currently operating among the plurality of field devices, switches the operating field device to a second field device that is another field device belonging to the same group, an operation of the second field device being stopped.

21 Claims, 6 Drawing Sheets

(56) References Cited

U.S. PATENT DOCUMENTS

2015/0236903 A1    8/2015   Kodama et al.
2017/0289255 A1*   10/2017   Urquhart ................ H04L 67/12

FOREIGN PATENT DOCUMENTS

JP      2013-218532 A    10/2013
JP      2015-154445 A    8/2015

* cited by examiner

BATTERY MANAGEMENT DEVICE, BATTERY MANAGEMENT SYSTEM, AND BATTERY MANAGEMENT METHOD

BACKGROUND OF THE INVENTION

Field of the Invention

The present invention relates to a battery management device, a battery management system, and a battery management method.

The present application claims priority based on Japanese patent application 2017-090722, filed on Apr. 28, 2017 and includes herein by reference the content thereof.

Description of Related Art

In a plant including various facilities, various sensors detecting predetermined physical quantities are disposed in each of the facilities disposed in the plant. In the plant, on the basis of measurement values representing physical quantities output from the sensors disposed in each of the facilities, the state of the operation of each of the facilities and the quality of a product produced in the facility are managed.

In a conventional plant, a sensor disposed in each facility is configured as a field device (a measurement device or an operation device) called field equipment for the purpose of monitoring the state of the operation of the facility or controlling the operation of the facility.

In recent years, as a structure linking data collected by objects connected to a network, the idea of the Internet of Things (IoT) has been proposed, and various technologies relating to this IoT have been proposed. For this reason, also in plants, realization of an Industrial Internet of Things (IIoT) combining an existing structure of monitoring the operation state of facilities, control of the operation thereof, and the like with technologies of the IoT has been reviewed. In a plant supporting an IIoT, by installing a plurality of field devices (measurement devices or operation devices) that are small and inexpensive in facilities and associating data output from the field devices, the operation state of facilities may be checked (monitored) from various viewpoints, and the operation of the facilities can be controlled.

For example, in Japanese Unexamined Patent Application, First Publication No. 2013-218532 (hereinafter, referred to as "Patent Document 1") and Japanese Unexamined Patent Application, First Publication No. 2015-154445 (hereinafter, referred to as "Patent Document 2"), technologies of radio communication systems have been disclosed in which a plurality of field devices (measurement devices and operation devices) called radio field devices capable of performing radio communication are installed in facilities disposed in a plant, and each of the radio field devices communicate using control signals, measurement signals, and the like through a radio network. In the radio communication systems disclosed in Patent Document 1 and Patent Document 2, each of the radio field devices performs radio communication with a relay device called a gateway for relaying data. In the radio communication systems disclosed in Patent Document 1 and Patent Document 2, the gateway communicates with a management device of a higher rank through a wired network.

In this way, in the technologies of the radio communication systems disclosed in Patent Document 1 and Patent Document 2, a plant supporting an IIoT having a configuration, in which a plurality of field devices installed in each facility disposed in a plant output (transmit) measurement values representing physical quantities detected by sensors to a management device of a higher rank through a gateway, can be realized.

SUMMARY OF THE INVENTION

In the radio communication systems disclosed in Patent Document 1 and Patent Document 2, a field device (a measurement device or an operation device) performing radio communication, for example, is driven by a battery installed in the field device such as a secondary battery such as a lithium ion battery or the like, in other words, is battery-driven. A field device of a battery-driven type is assumed to have a configuration in which an installed battery can be replaced or a configuration in which an installed battery cannot be replaced, a so-called disposable configuration. A field device having a configuration in which a battery can be replaced is assumed to have a configuration in which the battery can be replaced at any time by a manager, an operator, or the like belonging to the plant or a configuration in which the battery can be replaced only by a manufacturer of the field device, in other words, a configuration in which maintenance is necessary. There are some cases in which, even for a field device having a configuration in which a manager, an operator, or a manufacturer belonging to the plant can replace the battery, a battery replacement operation is not be able to performed on site depending on a position at which the field device is installed such as a position at which the field device is installed being an explosion-protection zone (an explosion-protection area) or the like.

In a plant, in order to maintain a sound operation (normality) of disposed facilities, for example, a maintenance operation for each of the facilities such as preventive maintenance or a regular repair is performed within predetermined periods of time over cycles (for example, every two years). For this reason, for a field device of a battery-driven type disposed in a plant, it is conceivable that replacement of the field device or an operation of battery replacement is not performed at the time of a preventive maintenance operation in the plant. Accordingly, in a field device of a battery-driven type installed in a plant, it is an important condition that there should be no occurrence of battery exhaustion in an installed battery before preventive maintenance, a regular repair, or the like is next performed. In other words, it is an important condition that the battery life of a field device of a battery-driven type installed in a plant be longer than a predetermined period of a cycle (for example, every two years). The reason for this is that, in a case in which battery exhaustion occurs in a field device of a battery-driven type before the next preventive maintenance, until the battery is replaced, and the field device operates again, measurement values used for performing monitoring of the operation state, control of the operation, and the like of facilities are lacking, and the normality of the facilities cannot be maintained.

Generally, as the magnitude (size) of a battery increases, a time until battery exhaustion (battery life) becomes longer. For this reason, in recent years, batteries of large capacity having a longer battery life (lasting for a longer period) for the same size have been developed and widely used. However, for a battery of a large capacity, an increase in the cost is more than an increase in the capacity (extension in the battery life). For example, when the capacity doubles (the battery life doubles) for a battery of the same size, the cost triples or quadruples. For this reason, installing a battery with a battery life longer than an interval between maintenance operations (for example, two years) in a field device of a battery-driven type becomes a cause preventing decrease in the size of a field device required for realizing a plant supporting an IIoT and decrease in the cost of the field device.

It is conceivable that, by using a primary battery such as a battery that is available on the market in a field device of a battery-driven type, the cost of the battery can be reduced to a very low level. However, since batteries that are available on the market are general-purpose products, it is assumed that these batteries will have a very short battery life acid that securing a period for the battery life having a stable length will not be inherently possible. Accordingly, there is a situation in which it is difficult to employ a battery available on the market as a battery to be installed in a field device used in a plant.

In a field device of a battery-driven type, increasing an interval (period) between which measurement values representing a physical quantity detected by a sensor are output (transmitted) through radio communication, in other words, decreasing the number of times of radio communication to lengthen the battery life is conceived. However, in such a case, the number of measurement values acquired from the field device is small, which becomes a cause disturbing the operation of actual facilities in the plant.

One aspect of the present invention provides a battery management device, a battery management system, and a battery management method managing batteries installed in a plurality of field devices of a battery-driven type installed in facilities disposed in a plant.

A battery management device according to a first aspect of the present invention for managing a plurality of field devices of a battery-driven type, the plurality of field devices being associated with a facility disposed in a plant and being defined as belonging to a same group may include a battery many that, in a case receiving battery life information representing approach to a battery life of an installed battery from a first field device that is one field device currently operating among the plurality of field devices, switches the operating field device to a second field device that is another field device belonging to the same group, an operation of the second field device being stopped.

In the above-stated battery management device, the battery manager may separately identify each of the plurality of field devices belonging to the same group on the basis of identification information exclusively assigned to the plurality of field devices. The battery manager may change tag information set to each of the plurality of field devices in the same group to switch the operating field device from the first field device to the second field device.

In the above-stated battery management device, the tag information may identify a field device currently operating and a field device of which an operation is stopped.

In the above-stated battery management device, in a case in which the operating field device is switched, the battery manager may stop an operation of the first field device by changing first tag information set in the first field device to be in a same state as that of second tag information set in the second field device and operate the second field device by changing the second tag information set in the second field device to be in a same state as that of the first tag information set in the first field device.

In the above-stated battery management device, in a case in which the operating field device is switched, the battery manager, after starting the second field device, may operate the second field device by changing the second tag information to be in a same state as that of the first tag information.

In the above-stated battery management device, the battery manager may transmit to the second field device operation control information used for starting the second field device to start the second field device.

In the above-stated battery management device, in a case in which the battery manager receives battery remaining amount information representing a remaining amount of the installed battery from the second field device of which the operation is stopped after receiving the battery life information from the first field device currently operating, the battery manager may operate the second field device by changing the second tag information to be in a same state as that of the first tag information.

In the above-stated battery management device, the battery manager may receive the battery remaining amount information from each of a plurality of field devices of which an operation is stopped, and change tag information set in a field device which has transmitted the battery remaining amount information representing the remaining amount higher than a predetermined value to be in a same state as that of the first tag information.

In the above-stated battery management device, the battery manager may prevent the first field device from transmitting the battery remaining amount information to the battery manager after stopping the operation of the first field device.

The above-stated battery management device may further include a failure processor that instructs replacement of the first field device in a case in which a failure occurs in a functional unit used for realizing a function of the first field device and included in the first field device currently operating. The battery manager may switch the operating field device from the first field device to the second field device based on the instruction of the replacement of the first field device output from the failure processor.

In the above-stated battery management device, the plurality of field devices may be installed at a same position in the facility.

A battery management system according to a second aspect of the present invention may include a plurality of field devices of a battery-driven type, the plurality of field devices being associated with a facility disposed in a plant and being defined as belonging a same group, and a battery management device for managing the plurality of field devices. The battery management device may include a battery manager that, in a case receiving battery life information representing approach to a battery life of an installed battery from a first field device that is one field device currently operating among the plurality of field devices, switches the operating field device to a second field device that is another field device belonging to the same group, an operation of the second field device being stopped.

In the above-stated battery management system, the battery management device may be a relay device transmitting information or data output from the field device currently operating to a host system built in the plant using all the plurality of field devices belonging to the same group as one field device.

In the above-stated battery management system the plurality of field devices may be installed at a same position in the facility.

In the above-stated battery management system, the second filed device may start every constant time and transmits battery remaining amount information representing a remaining amount of the installed battery to the battery management device.

In the above-stated battery management system, in a case in which the battery manager receives the battery remaining amount information from the second field device of which the operation is stopped after receiving the battery life information from the first field device currently operating, the battery manager may switch the operating field device to the second field device.

In the above-stated battery management system, the battery manager may transmit to the second field device operation control information used for starting the second field device to start the second field device after receiving the battery life information from the first field device currently operating.

In the above-stated battery management system, each of the plurality of field devices may include a sensor for detecting physical quantities of the facility.

The above-stated battery management system may further include a sensor that detects physical quantities of the facility and transmits the detected physical quantities to each of the plurality of field devices.

A battery management method according to a third aspect of the present invention for managing a plurality of field devices of a battery-driven type, the plurality of field devices being associated with a facility disposed in a plant and being defined as belonging to a same group may include, in a case a battery manager receives battery life information representing approach to a battery life of an installed battery from a first field device that is one field device currently operating among the plurality of field devices, switching the operating field device to a second field device that is another field device belonging to the same group, an operation of the second field device being stopped.

According to the one aspect of the present invention, a battery management device, a battery management system, and a battery management method managing batteries installed in a plurality of field devices of a battery-driven type installed in facilities disposed in a plant can be provided.

DETAILED DESCRIPTION OF THE INVENTION

First Embodiment

Hereinafter, an embodiment of the present invention will be described with reference to the drawings. In the following description, an example of a case in which a battery management device according to a first embodiment of the present invention manages batteries installed in three sensor devices that are field devices of a battery-driven type of the same type detecting predetermined physical quantities using sensors will be described.

Figure 1:
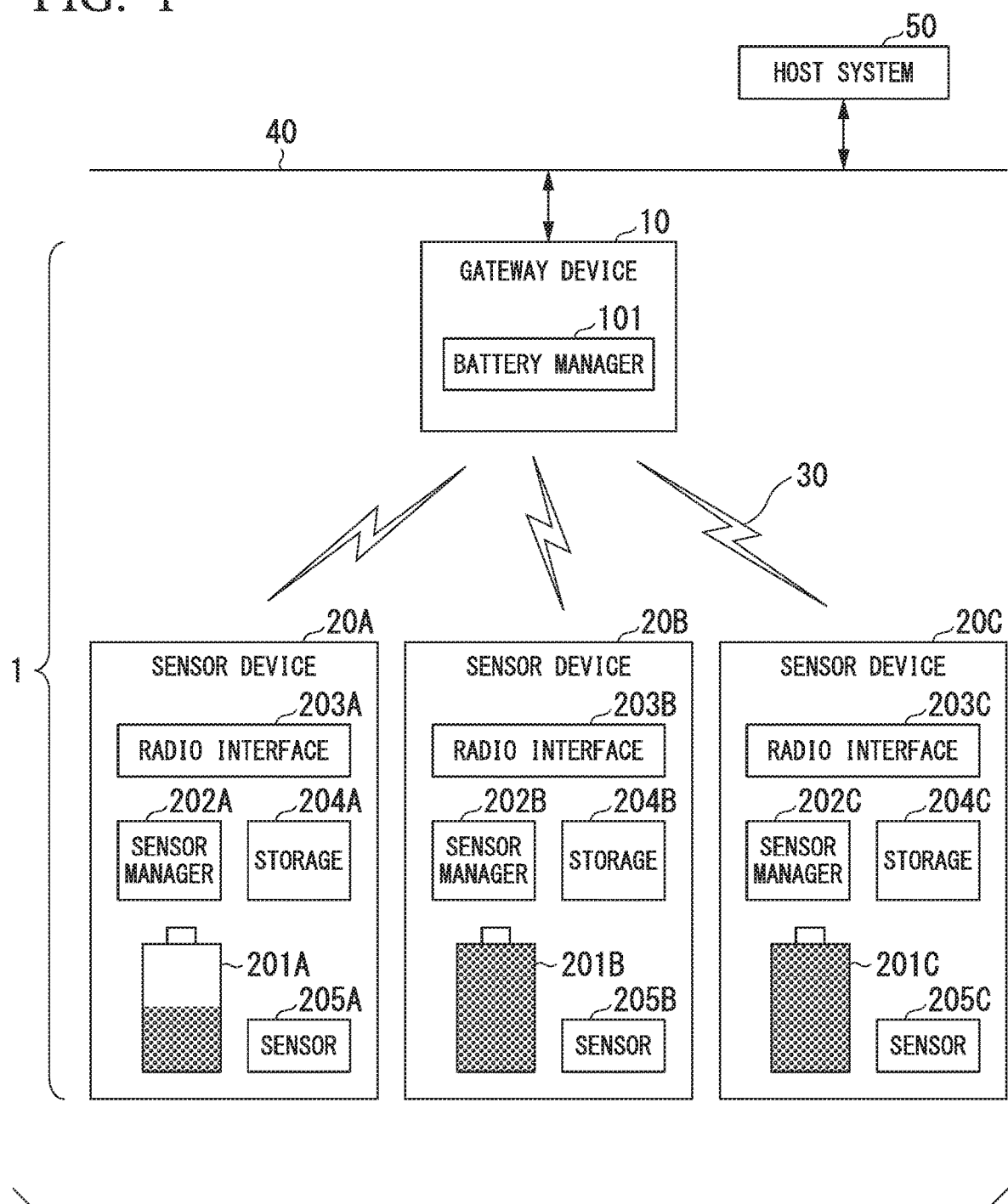
FIG. 1 is a block diagram showing a schematic configuration of a battery management device according to a first embodiment of the present invention and a schematic configuration of a battery management system according to the first embodiment including field devices managed by the battery management device.

FIG. 1 is a block diagram showing a schematic configuration of a battery management device according to the first embodiment of the present invention and a schematic configuration of a battery management system according to the first embodiment including field devices (sensor devices) managed by the battery management device. The battery management system 1 includes a gateway device 10, and three sensor devices including a sensor device 20A, a sensor device 20B, and a sensor device 20C. In the following description, in a case in which the three sensor devices including the sensor device 20A, the sensor device 20B, and the sensor device 20C are represented without being distinguished from each other, each thereof will be referred to as a "sensor device 20".

FIG. 1 shows the battery management system 1 having a configuration in which the battery management device according to the first embodiment of the present invention is configured as a gateway device 10, and the gateway device 10 is connected to three sensor devices 20 that are targets for the management of batteries using the battery management device through radio communication 30. FIG. 1 additionally shows a host system 50 that exchanges (transmits and receives) data such as measurement values acquired by the battery management system 1 from the sensor devices 20 through a field network 40.

The field network 40 is a wired or wireless dedicated communication network built inside a plant. As a communication standard applied to the field network 40 for example, any one of various communication standards and systems applied to a plant such as an industrial radio standard such as ISA 100.11a, a radio standard such as a sensor network system, a communication standard in which wireless communication and wired communication are mixed such as Wireless/Wired HART (registered trademark), a communication standard of a master/slave system such as MODBUS (registered trademark), and a field bus standard such as a Foundation (registered trademark) field bus or a process field bus (PROFIBUS) (registered trademark) may be conceived.

As the plant, in addition to an industrial plant performing petroleum refining or production of chemical products, a plant that manages and controls a well site of a gas field, an oil field, or the like and the surroundings thereof, a plant that manages and controls hydroelectric power generation, thermal power generation, nuclear power generation, or the like, a plant that manages and controls renewable power generation such as solar power generation and wind power generation, or the like, and a plant that manages and controls water supply and sewerage, a dam, or the like are included.

The host system 50 is a control system of a higher rank in a system built in a plant. The host system 50 monitors the operation state of each of facilities disposed in the plant and performs control and the like of the operation of each of the facilities. The host system 50, for example, is a control system such as a distributed control system (DCS).

Each of the sensor device 20A, the sensor device 20B, and the sensor device 20C is a field device (measurement device) of a battery-driven type installed in facilities disposed in the plant for realizing an Industrial Internet of Things (IIoT) in the plant. Each of the sensor device 20A, the sensor device 20B, and the sensor device 20C is installed at a position for detecting a predetermined physical quantity in facilities inside the plant and detects the predetermined physical quantity using a sensor in a normal operation. In the battery management system 1, each of the sensor device 20A, the sensor device 20B, and the sensor device 20C is installed at a position close to the facilities disposed in the plant (hereinafter, referred to as "same position"). Accordingly, each of the sensor device 20A, the sensor device 20B, and the sensor device 20C detects a predetermined physical quantity of the same kind to each other in the installed facilities using a sensor. The same position does not indicate single point, but has a certain area. In this certain area, the sensor device 20A, the sensor device 20B, and the sensor device 20C may be installed so that each of the sensor device 20A, the sensor device 20B, and the sensor device 20C can detect the physical quantity with regard to the target facilities. Each of the sensor device 20A, the sensor device 20B, and the sensor device 20C outputs (transmits) measurement values representing the physical quantity detected using the sensor to the gateway device 10 through radio communication 30.

In the battery management system 1, each of the sensor device 20A, the sensor device 20B, and the sensor device 20C operates as one sensor device 20. For this reason, in the battery management system 1, the sensor device 20A, the sensor device 20B, and the sensor device 20C are defined as sensor devices 20 belonging to the same group, and the operation (running) of each of the sensor device 20A, the sensor device 20B, and the sensor device 20C is controlled by the battery management device. More specifically, in the battery management system 1, in accordance with the control of the battery management device, only one sensor device 20 among the sensor device 20A, the sensor device 20B, and the sensor device 20C is controlled such that it performs a normal operation, and the remaining sensor devices 20 are controlled such that they are brought into a standby (sleep) state in which the operation thereof is stopped. For this reason, in the battery management system 1, only one sensor device 20 among the sensor device 20A, the sensor device 20B, and the sensor device 20C controlled such that it performs a normal operation by the battery management device outputs (transmits) a measurement value representing a physical quantity detected by the sensor to the gateway device 10 through the radio communication 30. In the battery management system 1, the consumption of batteries installed in the remaining sensor devices 20 controlled such that the operation thereof is stopped by the battery management device is reduced.

The sensor device 20 includes a battery 201, a sensor manager 202, a radio interface (I/F) 203, a storage 204, and a sensor 205. In FIG. 1, in order to distinguish the constituent elements described above included in the sensor device 20A, the sensor device 20B, and the sensor device 20C, parts of reference signs of the sensor device 20A, the sensor device 20B, or the sensor device 20C, more specifically, "A", "B", or "C" are assigned after a reference numeral of each constituent element.

The battery 201 is a small-size battery supplying power to each constituent element included in the sensor device 20. The battery 201, for example, may be an AA-size battery. The battery 201 may be an AAA-size battery (primary battery) or, for example, a rechargeable battery such as a lithium ion secondary battery.

The sensor 205 is a sensor that detects a physical quantity (analog quantity), which is predetermined, at a position in facilities in which the sensor device 20 is installed. The sensor 205, for example, may be a vibration sensor detecting the vibration of facilities or a temperature sensor detecting the temperature of facilities. The sensor 205, in a normal operation, outputs a signal representing a detected physical quantity to the sensor manager 202. The sensor 205 is not limited to a vibration sensor or a temperature sensor described above and any of various sensors detecting various quantities in facilities are conceivable.

The storage 204 stores at least identification information (ID) used for identifying the sensor device 20 (hereinafter, referred to as a "device ID") and tag information used for identifying each sensor device 20 only within a group defined in the battery management system 1 (hereinafter, referred to a "device tag"). The storage 204, for example, may be configured to include various memories such as a read only memory (ROM), a random access memory (RAM), and a flash memory and stores each of pieces of information of a device ID and a device tag.

The device ID is information used for identifying each sensor device 20 such as model numbers (serial numbers) that are exclusively assigned to the sensor devices 20. As the device ID, for example, identification information such as "EUI64" that is 64-bit identification information (device unique information) assigned in advance for uniquely identifying each sensor device 20 may be used. The device ID is identification information that cannot be changed.

The device tag is arbitrary tag information set for separately identifying each sensor device 20 only within the same group defined in the battery management system 1 when the battery management device controls the operation (running) of the sensor device 20. The device tag is tag information that can be changed in the control of the operation (running) of the sensor device 20 using the battery management device. As the device tag, for example, tag information used for separately identifying each sensor device 20 belonging to the same group may be set by combining a product name of the sensor device 20 and an exclusive symbol or number, and tag information used for distinguishing a sensor device 20 controlled such that it performs a normal operation and a sensor device 20 controlled to stop the operation from each other may be set. For example, exclusive device tags may be set with the device tag of the sensor device 20A set as "sensor A", the device tag of the sensor device 20B set as "sensor B", and the device tag of the sensor device 20C set as "sensor C". The device tag of a sensor device 20 controlled such that it performs a normal operation may be "normal operation sensor", the device tags of a plurality of sensor devices 20 controlled to stop the operation may not be set, or the same device tag such as "stopped sensor" may be set.

In the present invention, the formats of a device ID and a device tag stored in the storage 204 are not particularly defined.

The storage 204, in addition to the device ID and the device tag, may store tag information used for identifying a group of the sensor device 20 defined in the battery management system 1 (hereinafter, referred to as "group tag"). Here, the group tag is information exclusively set for each group of sensor devices 20 defined in the battery management system 1 and used for collectively identifying all the sensor devices 20 belonging to the same group as one. As the group tag, for example, tag information used for identifying a group of sensor devices 20 belonging to the same group in the plant as one sensor device 20 such as facilities (the position of facilities, a facility number, or the like) in which the sensor devices 20 belonging to the same group are installed, physical quantities detected in the facilities, or the like may be set.

The sensor manager 202 is a controller that controls all the sensor devices 20. The sensor manager 202 calculates a measurement value representing a physical quantity that is detected and output by the sensor 205. In the present invention, a method of calculating a measurement value representing a physical quantity output from the sensor 205 using the sensor manager 202 is not particularly defined. The sensor manager 202 outputs data of the calculated measurement values to the radio interface 203 and outputs (transmits) the data to the gateway device 10 through the radio communication 30. At this time, the sensor manager 202 outputs information of a device ID stored in the storage 204 to the radio interface 203 together with the calculated measurement values and outputs (transmits) the information to the gateway device 10 through the radio communication 30. In this way, the gateway device 10 that has received measurement values output (transmitted) through the radio communication 30 can recognize a sensor device 20 from which measurement values have been output (transmitted) on the basis of the information of the device ID output (transmitted) together with the data of the measurement values.

When the data of measurement values is output (transmitted) to the gateway device 10, the sensor manager 202 may output the information of a device tag together with the information of a device ID or instead of the information of a device ID to the radio interface 203. Also in such a case, the gateway device 10 can recognize a sensor device 20 that has output (transmitted) measurement values on the basis of the information of a device tag that has been output (transmitted) together with the data of the measurement values.

The sensor manager 202 controls the supply of power to each constituent element included in the sensor device 20 from the battery 201 in accordance with control information used for controlling the operation (running) of the sensor device 20 that is output (transmitted) from the battery management device through the radio communication 30 and is output from the radio interface 203 (hereinafter, referred to as "operation control information"). More specifically, the sensor manager 202 included in the sensor device 20 controlled such that it performs a normal operation from the battery management device performs control such that the battery 201 supplies power to each constituent element by connecting the battery 201 and the radio interface 203, the storage 204, and the sensor 205. The sensor manager 202 included in the sensor device 20 controlled to stop the operation from the battery management device performs control such that the battery 201 does not supply power to each constituent element by blocking the connection between the battery 201 and the radio interface 203, the storage 204, and the sensor 205 and suppresses consumption of the battery 201.

The sensor manager 202 monitors the amount of consumption of the battery 201 (in other words, the remaining amount of the battery 201) and determines the battery life of the battery 201 on the basis of the amount of consumption of the battery 201 that has been monitored. In a case in which the amount of consumption of the battery 201 that has been monitored is larger than an amount of consumption set advance, the sensor manager 202 outputs information representing approach to the battery of the battery 201 (hereinafter, referred to as "battery life information") to the radio interface 203 and outputs (transmits) the information to the gateway device 10 (in other words, the battery management device) through the radio communication 30. For example, the output voltage of the battery 201 may be monitored, and, in a case in which the monitored output voltage is lower than a voltage value predetermined, the sensor manager 202 may determine that the battery life of the battery 201 is approaching and output (transmit) battery life information to the battery management device. In the present invention, a method of monitoring the amount of consumption of the battery 201 using the sensor manager 202 is not particularly limited. The sensor manager 202 outputs one or both of the information of a device ID and the information of a device tag stored in the storage 204 to the radio interface 203 together with the battery life information and outputs (transmits) the information to the gateway device 10 through the radio communication 30. In this way, the battery management device that has received the battery life information output (transmitted) through the radio communication 30 can recognize that the battery life of the battery 201 of a specific sensor device 20 is approaching on the basis of the information output (transmitted) together with the battery life information. The sensor manager 202 controls the supply of power from the battery 201 to each constituent element included in the sensor device 20 in accordance with operation control information output (transmitted) from the battery management device in accordance with the output (transmitted) battery life information.

While each constituent element included in the sensor device 20 is controlled such that operation thereof is stopped by the battery management device stopping operation thereof to reduce the consumption of the battery 201, the sensor manager 202 actively operates at predetermined fixed time intervals (for example, every 24 hours). For example, in the sensor manager 202, only a timer function does not stop its operation and operates every predetermined constant time. The sensor manager 202 that has actively operated checks the remaining amount of the battery 201, outputs information representing the checked remaining amount of the battery 201 (hereinafter, referred to as "battery remaining amount information") to the radio interface 203, and outputs (transmits) the information to the gateway device 10 (in other words, the battery management device) through the radio communication 30. Also at this time, the sensor manager 202 outputs the information of a device ID stored in the storage 204 to the radio interface 203 together with the battery remaining amount information and outputs (transmits) the information described above to the gateway device 10 through the radio communication 30. In this way, the battery management device that has received the battery remaining information output (transmitted) through the radio communication 30 can regularly check the remaining amount of the battery 201 included in each sensor device 20 controlled to stop the operation. In a case in which the device tag stored in the storage 204 is an exclusive device tag set for separately identifying each sensor device 20 belonging to the same group, the sensor manager 202 may output (transmit) one or both of the information of a device ID and the information of a device tag to the gateway device 10 together with the battery remaining information.

In the battery management system 1, before a battery life of the battery 201 mounted in the sensor device 20 that is currently performing a normal operation approaches, one of sensor devices 20 that belongs to the same group of which operation thereof has been stopped to reduce consumption of the battery 201 may be switched to a normal operation. In other words, in the battery management system 1, the operations (running) of the sensor devices 20 are controlled such that the operation of a sensor device 20 that is currently performing a normal operation for which it is predicted that the battery life of the battery 201 is approaching is stopped, and another sensor device 20 of which operation thereof has previously been stopped and which belongs to the same group becomes the sensor device 20 performing a normal operation next. In the battery management system 1, the process of switching between sensor devices 20 is performed by the battery management device configured in the gateway device 10 on the basis of the battery life information and the battery remaining amount information. More specifically, in the battery management system 1, after the battery life information is output from the sensor device 20 that is currently performing a normal operation, the battery management device performs switching of the sensor device 20 performing a normal operation at a timing at which the battery remaining information is output from another sensor device 20 of which the operation is stopped. In other words, in the battery management system 1, instead of immediately performing switching of a sensor device 20 performing a normal operation when a sensor device 20 that is currently performing a normal operation outputs battery life information, a timing at which a sensor device 20 performing a normal operation is switched is at intervals of once in each of predetermined fixed time intervals (for example, once every 24 hours). Therefore, in the sensor device 20 which is currently performing a normal operation and of which battery life information has been output, the battery life of the battery 201 should be at least equal to or longer than the period of the cycle of outputting the remaining battery amount information from the other sensor devices 20 whose operation is stopped (for example, 24 hours or longer). In this way, in the battery management system 1, there is no need to operate the sensor device 20, of which the operation is stopped, more than is necessary for outputting the battery remaining amount information.

The radio interface 203 exchanges (transmits/receives) various information with the gateway device 10 through the radio communication 30. More specifically, the radio interface 203, in a normal operation of the sensor device 20, outputs (transmits) data of measurement values and information of a device ID (may be a device tag) output from the sensor manager 202 to the gateway device 10 through the radio communication 30. When the sensor manager 202 notifies the battery management device approach to the battery life of the battery 201, the radio interface 203 outputs (transmits) the battery life information and the information of a device ID (may be a device tag) output from the sensor manager 202 to the gateway device 10 through the radio communication 30. When the battery management device controls the operation (running) of the sensor device 20, the radio interface 203 receives operation control information output (transmitted) from the battery management device through the radio communication 30 and outputs the received operation control information to the sensor manager 202.

The radio interface 203 included in the sensor device 20 of which the operation is controlled to be stopped by the battery management device, as described above, stops the operation for suppressing the consumption of the battery 201. However, similar to when the sensor manager 202 outputs (transmits) the battery remaining amount information to the gateway device 10, in other words, when the sensor manager 202 operates at every predetermined constant time (for example, for every 24 hours) and outputs (transmits) the battery life information, the radio interface 203 outputs (transmits) the battery remaining amount information output from the sensor manager 202 to the gateway device 10.

The radio communication 30 is a communication path compliant with a radio communication standard for performing communication between the gateway device 10 and the sensor device 20A, the sensor device 20B, and the sensor device 20C. The radio communication 30 is a communication path compliant with ISA 100.11a. The communication standard applied to the radio communication 30, for example, may be any one of various radio communication standards such as a radio communication standard including wireless LAN communication (so-called Wi-Fi (registered trademark)), a short-distance radio communication standard including Bluetooth (registered trademark), and an infrared communication standard including Infrared Data Association (IrDA (registered trademark)).

The gateway device 10 is a relay device that relays various kinds of information and data exchanged between a field instrument (a measurement device or an operation device) called a field device (radio field device) and the host system 50 connected through the field network 40 for the purpose of monitoring the states of the operations of facilities disposed in a plant, which are connected through the radio communication 30, and controlling the operations of the facilities. In FIG. 1, a radio interface that is a constituent element performing radio communication with the field device through the radio communication 30 in the gateway device 10 and a communication interface that performs communication with the host system 50 through the field network 40 are not shown.

The gateway device 10, in a normal operation, outputs (transmits) data of measurement values output (transmitted) from one of sensor devices 20 among the sensor device 20A, the sensor device 20B, and the sensor device 20C controlled such that it performs the normal operation from the battery management device through the radio communication 30 to the host system 50 through the field network 40. In the configuration 15 shown in FIG. 1, while there are cases in which the gateway device 10 performs communication (transmission/reception) with the sensor device 20A, the sensor device 20B, and the sensor device 20C through the radio communication 30, the gateway device 10 performs communication (transmission/reception) with the host system 50 through the field network 40 using the sensor device 20A, the sensor device 20B, and the sensor device 20C as one sensor device 20. For this reason, the gateway device 10 outputs (transmits) tag information (for example, information of a group tag stored in the storage 204 included in the sensor device 20) used for identifying a group to which the sensor device 20 that has output (transmitted) the data of measurement values through the radio communication 30, in other words, controlled such that it performs a normal operation from the battery management device to the host system 50 together with the data of the measurement value.

The gateway device 10 includes the battery manager 101 as a constituent element used for realizing the function of the battery management device. The battery manager 101 performs switching of the sensor device 20 to be operated on the basis of the battery life information and the battery remaining amount information output (transmitted) from each sensor device 20 belonging to the same group through the radio communication 30. More specifically, the battery manager 101 performs control such that the operation of the sensor device 20 that has transmitted the battery life information is stopped, and also controls the other sensor devices 20 belonging to the same group that have transmitted the battery remaining amount information such that any one of the sensor devices 20 performs a normal operation. In this way, in the battery management system 1, for example, even in a case in which the battery life of the battery 201 installed in the sensor device 20 is shorter than a constant period (for example, two years) of a maintenance operation for facilities performed in a plant such as a preventive maintenance or a regular repair, the sensor device 20 can be viewed from the host system 50 as continuing the normal operation without the end of the life of the battery 201 being reached. In other words, in the battery management system 1, in the case of being viewed from the host system 50, it appears that battery exhaustion does not occur in the sensor device 20 until preventive maintenance or a regular repair is performed next time.

The battery manager 101 regularly checks the remaining amount of the battery 201 installed in each sensor device 20 belonging to the same group on the basis of the battery remaining amount information output (transmitted) from each sensor device 20 through the radio communication 30. The battery manager 101 may output (transmit) information representing the sensor device 20 that has output (transmitted) the battery life information or the sensor device 20 having a remaining amount of the battery 201 of which operation thereof has been controlled such that it is stopped which is low to the host system 50 through the field network 40. In this way, the host system 50 that has received the information of the battery 201 installed in the sensor device 20 that has been output (transmitted) through the field network 40 can perform necessary preparations for replacing the battery 201 of the sensor device 20 installed in the facilities.

In addition to the sensor devices 20 shown in FIG. 1, various field devices (measurement devices or operation devices) may be connected to the gateway device 10 through the radio communication 30. The gateway device 10 may have a function of a data collecting device that collects data output (transmitted) from a plurality of field devices connected through the radio communication 30 and outputs (transmits) the collected data through the field network 40 to the host system 50.

The field devices connected to the gateway device 10 through the radio communication 30 may have various configurations such as a configuration in which a plurality of field devices are grouped as one and operate, like the sensor devices 20 shown in FIG. 1, and a configuration in which the field devices operate independently. For this reason, the gateway device 10 manages field devices in association with each other by performing a process of a radio connection called "provisioning" for field devices (radio field devices) connected through the radio communication 30. In this provisioning, the gateway device 10 acquires information such as identification information (for example, the device ID described above) or the like of the field device, issues identification information (ID) of the radio communication 30 and information called a join key corresponding to a password that is necessary for a connection of each field device through the radio communication 30, and stores the issued information in each field device. As a result, in the case of a field device in which provisioning has been performed with the gateway device 10, if the connection to the gateway device 10 is interrupted and then the connection to the gateway device 10 is resumed, by transmitting the stored join key to the gateway device 10, the gateway device 10 can authenticate the on-site device, and the connection to the gateway device 10 through the radio communication 30 can be restarted. The sensor device 20 stores the identification information (ID) of the radio communication 30 and information of a join key or the like issued by the gateway device 10 in the storage 204.

According to such a configuration, in the battery management system 1, the battery manager 101 included in the gateway device 10 performs control such that only one sensor device 20 among plurality of sensor devices 20 belonging to the same group outputs (transmits) a measurement value representing a physical quantity detected using the sensor 205 in a normal operation to the gateway device 10 through the radio communication 30. In the battery management system 1, the battery manager 101 performs control such that the remaining sensor devices 20 belonging to the same group are brought into a standby (sleep) state and stop operating.

In the configuration of the battery management system 1 shown in FIG. 1, while a configuration in which the battery manager 101 is configured inside the gateway device 10 is shown, the battery manager 101 may be configured outside the gateway device 10, in other words, in a position parallel to the gateway device 10.

Figure 2:
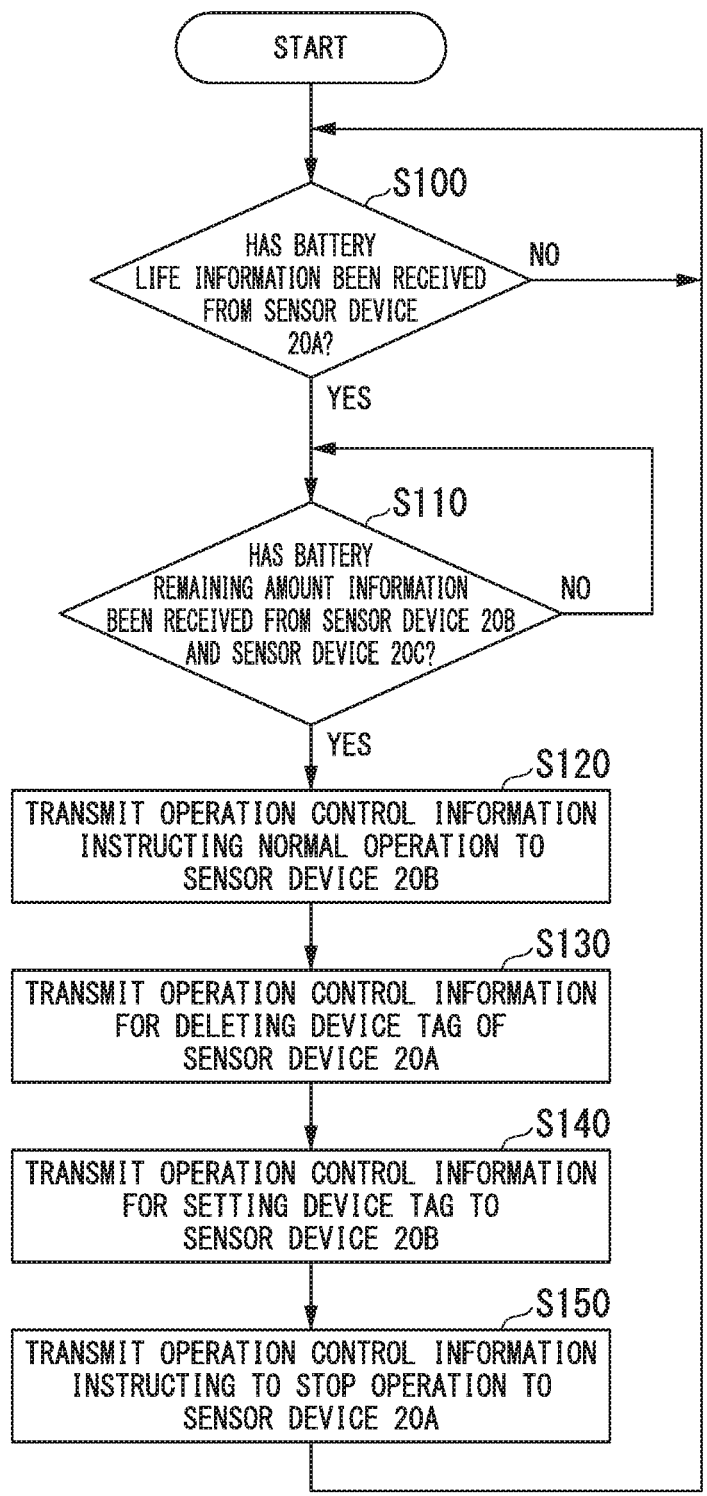
FIG. 2 is a flowchart showing an example of the processing sequence of a process of changing a field device in the battery management device according to the first embodiment of the present invention.

Next, the processing sequence of the process of switching sensor devices to be operated using the battery management device will be described. FIG. 2 is a flowchart showing an example of the processing sequence of the process of changing a field device, in other words, a sensor device 20 in the battery management device, that is, the battery manager 101 included in the gateway device 10 according to the first embodiment of the present invention.

In the following description, it is assumed that three sensor devices 20 including the sensor device 20A, the sensor device 20B, and the sensor device 20C shown in FIG. 1 are installed at the same position of facilities, are already connected to the gateway device 10 through radio communication 30 using provisioning, and are defined as sensor devices 20 belonging to the same group. In the following description, it is assumed that the battery manager 101 identifies the three sensor devices 20 including the sensor device 20A, the sensor device 20B, and the sensor device 20C using device IDs and sets a device tag only in the sensor device 20 currently performing a normal operation, in other words, device tags of sensor devices 20 of which the operations are controlled to be stopped are not set. In the following description, a state is assumed in which the battery manager 101 included in the gateway device 10 already has controlled the sensor device 20A to perform a normal operation and controls the sensor device 20B and the sensor device 20C to stop the operation.

In the configuration of the battery management system 1 shown in FIG. 1, the battery manager 101 realizing the function of the battery management device is provided in the gateway device 10. For this reason, the battery manager 101 has a configuration for performing radio communication with the sensor devices 20 through a radio interface, which is not shown in the drawing, included in the gateway device 10 and the radio communication 30. In other words, operation control information output by the battery manager 101 to each sensor device 20 is output (transmitted) to each sensor device 20 by the radio interface not shown in the drawing through the radio communication 30, and data or information output (transmitted) from each sensor device 20 through the radio communication 30 is configured to be received by the radio interface not shown in the drawing and is output to the battery manager 101. However, in the following description, for the convenience of description, the battery manager 101 will be described to performing radio communication with each sensor device 20 through the radio communication 30.

FIG. 2 shows an example of the process of switching a sensor device 20 to perform a normal operation front the sensor device 20A to the sensor device 20B using the battery manager 101 included in the gateway device 10. More specifically, the process of switching the sensor device 20 using the battery manager 101 shown in FIG. 2 is a process of switching a sensor device 20 to perform a normal operation from the sensor device 20A to the sensor device 20B when approaching the battery life of the battery 201A installed in the sensor device 20A performing a normal operation.

The process of switching the sensor device 20 using the battery manager 101 shown in FIG. 2 is started when the battery manager 101 is operated.

When the battery manager 101 starts the process of switching the sensor device 20, first, it is determined whether or not battery life information indicating that the battery life of the battery 201A is approaching output (transmitted) from the sensor device 20A that is currently performing a normal operation has been received (Step S100). When the result of the determination in Step S100 is that the battery life information has not been received from the sensor device 20A, in other words, the output voltage of the battery 201A installed in the sensor device 20A is not lower than a predetermined voltage value ("NO" of Step S100), the process returns to Step S100, and the battery manager 101 waits for the reception of the battery life information from the sensor device 20A.

On the other hand, as a result of the determination of Step S100, in a case in which the battery life information has been received from the sensor device 20A, in other words, the output voltage of the battery 201A installed in the sensor device 20A is lower than the predetermined voltage value, and the battery life is approaching ("YES" of Step S100), the battery manager 101 determines to switch the sensor device 20 to perform a normal operation from the sensor device 20A.

The battery manager 101 determines whether or not battery remaining amount information has been received from the sensor device 20B and the sensor device 20C, of which the operations are controlled to be stopped, belonging to the same group as that of the sensor device 20A (Step S110). As a result of the determination of Step S110, in a case in which the battery remaining amount information has not been received from either one of the sensor device 20B and the sensor device 20C, in other words, it is not a timing at which any one of the sensor device 20B and the sensor device 20C is operated for every constant time predetermined (for example, for every 24 hours) ("NO" in Step S110), the process is returned to Step S110, and the battery manager 101 waits for the reception of battery remaining amount information from any one of the sensor device 20B and the sensor device 20C.

On the other hand, as a result of the determination of Step S110, in a case in which the battery remaining amount information has been received from any one of the sensor device 20B and the sensor device 20C, in other words, it is a timing at which any one of the sensor device 20B and the sensor device 20C is operated for every constant time predetermined (for example, for every 24 hours) ("YES" in Step S110), the battery manager 101 controls the sensor device 20 that has output (transmitted) the battery remaining amount information representing that the remaining amount of the battery 201 is sufficient to perform a normal operation. For example, in a case in which the battery remaining amount information includes the output voltage of the battery 201A, the battery manager 101 controls the sensor device 20 that has output (transmitted) the battery remaining amount information including the output voltage which is higher ham the predetermined voltage value. In the switching process of the sensor device 20 shown in FIG. 2, the sensor device 20B is controlled such that it performs a normal operation, and the sensor device 20C is controlled such that its current state is maintained, that is, operation thereof is stopped.

The battery manager 101 outputs (transmits) operation control information instructing the sensor device 20B to perform a normal operation to the sensor device 20B through the radio communication 30 (Step S120). The battery manager 101 outputs (transmits) operation control information used for causing the sensor device 20A to delete the device tag, in other words, to be in a device tag state that is the same as that of the sensor device 20 of which the operation is controlled to be stopped to the sensor device 20A through the radio communication 30 (Step S130). The battery manager 101, in Step S130, may output (transmit) operation control information used for setting the same device tag (for example, a "stopped sensor" or the like) that is the same as that of the sensor device 20 of which the operation is controlled to be stopped to the sensor device 20A.

Subsequently, in a case in which the sensor device 20B receives an instruction to perform a normal operation, the battery manager 101 outputs (transmits) operation control information used for setting a device tag (for example, a "normal operation sensor" or the like) representing a sensor device 20 to perform a normal operation to the sensor device 20B through the radio communication 30 (Step S140). In this way, the sensor device 20B start an operation as the sensor device 20 performing a normal operation in the battery management system 1. When the device tag of the sensor device 20A is deleted, the battery manager 101 outputs (transmits) operation control information used for controlling the sensor device 20A to stop the operation to the sensor device 20A through the radio communication 30 (Step S150). In this way, the sensor device 20A becomes the sensor device 20 of which the operation controlled to be stopped in the battery management system 1.

When the operation of the sensor device 20A is controlled to be stopped in Step S150, or after the operation of the sensor device 20A is controlled to be stopped, the battery manager 101 may perform control such that the sensor device 20A does not output (transmit) the battery remaining amount information to the battery manager 101. After controlling the operation of the sensor device 20 such that it is stopped in step S150, the battery manager 101 may output (transmit) information indicating that switching of the sensor device 20 has been performed to the host system 50 via the field network 40 to notify that the battery life of the battery 201A of the sensor device 20A is approaching.

Thereafter, the process is returned to Step S100, and the battery manager 101 repeats the determination of whether or not battery life information representing approach the battery life of the battery 201B installed in the sensor device 20B controlled such that it performs a normal operation has been received. When the battery life information representing that the battery life of the battery 201B is approaching has been received from the sensor device 20B performing a normal operation, the battery manager 101, similar to the description presented above, performs the processes of Steps S110 and S150 and switches the sensor device 20 to perform a normal operation from the sensor device 20B to the sensor device 20C.

For the sensor device 20A of which the operation is controlled to be stopped in Step S150 in accordance with approaching the battery life of the battery 201A, for example, when a maintenance operation such as preventive maintenance or a regular repair is performed, the installed battery 201A is replaced with a new battery 201A. A timing at which the battery 201A installed in the sensor device 20A is replaced is not limited to the timing of the maintenance operation described above. For example, when another operation is necessary in the facilities in which the sensor device 20A is installed or at an arbitrary timing after the information representing that the switching of the sensor device 20 has been performed by the battery manager 101 is notified to the host system 50, the battery 201A installed in the sensor device 20A may be replaced. In this way, in the battery management system 1, similar to the description presented above, when approaching the battery life of the battery 201 installed in another sensor device 20 (for example, the battery 201C installed in the sensor device 20C), the sensor device 20A can be controlled such that it performs a normal operation again by the battery manager 101.

In a case in which the positions at which the sensor device 20A to the sensor device 20C are installed are in an explosion-protection zone (an explosion-protection area), when the battery 201A installed in the sensor device 20A is replaced, it is necessary to replace the battery 201A after the sensor device 20A is carried outside the explosion-protection area. For this reason, the radio communication of the sensor device 20A that has been carried outside the explosion-protection area with the gateway device 10 through the radio communication 30 is interrupted. However, since the sensor device 20A has completed provisioning with the gateway device 10 and stores information such as a join key and the like in the storage 204, by installing the sensor device 20A of which the battery 201A has been replaced at the same position in the facilities again, a connection with the gateway device 10 through the radio communication 30 can be resumed without newly performing the process of provisioning. In other words, even in a case in which a connection with the gateway device 10 is interrupted, the sensor device 20 can resume the connection with the gateway device 10 without performing any setting or the like for the sensor device 20.

According to such a process, in the battery management system 1, when approaching the battery life of the battery 201 installed in any one of sensor devices 20, which perform normal operations, belonging to the same group, the battery manager 101 included in the gateway device 10 switches the operation of another sensor device 20, of which the operation is stopped for suppressing the consumption of the battery 201, belonging to the same group to a normal operation.

In the switching process of the sensor device 20 using the battery manager 101 shown in FIG. 2, a case has been described in which the battery manager 101 determines whether or not battery remaining amount information has been received in Step S110, and the process of switching the sensor device 20 performing a normal operation (the processes of Steps S120 to S150) is performed. However, the start of the process of switching the sensor device 20, for example, may be configured to be inquired of the battery manager 101 from the sensor device 20 when the sensor device 20 of which the operation is stopped outputs the battery remaining amount information.

In this way, in the battery management system 1, among a plurality of sensor devices 20 belonging to the same group, only one sensor device 20 is caused to perform a normal operation, and the operations of the remaining sensor devices 20 are controlled to be stopped to suppress the consumption of the battery 201. In this way, in battery management system 1, even in a case in which the battery life of the battery 201 installed in each sensor device 20 belonging to the same group is short, a measurement value representing a physical quantity detected by the sensor 205 can be output (transmitted) to the host system 50 without the measurement value being deficient. In other words, the battery management system 1 is operated as a measurement system corresponding to the IIoT in which battery exhaustion does not occur for a necessary period until preventive maintenance, a regular repair, or the like is performed next time or more, whereby a plant corresponding to the IIoT can be realized.

In addition, in the battery management system 1, a plurality of sensor devices 20 installed at the same position of facilities are defined as the same group. For this reason, from the host system 50, the plurality of sensor devices 20 can be regarded as one sensor device 20. In this way, a plant corresponding to the IIoT can be realized more easily without performing a change or the like of the configuration of the host system 50 in the plant in order to support the IIoT.

In the battery management system 1 shown in FIG. 1, a case has been described in which three sensor devices 20 belong to the same group. However, the number of sensor devices 20 belonging to the same group is determined, on the basis of the time of the battery life of the battery 201 and a maximum period in which the battery 201 installed in the sensor device 20 cannot be replaced. In other words, the number of sensor devices 20 installed at the same position in facilities disposed in a plant is determined such that a sum time of limit times of batteries 201 is longer than a maximum period in which the battery 201 installed in the sensor device 20 cannot be replaced. At this time, a margin may be arranged in the number of sensor devices 20 installed at the same position, and the number may be increased such that the sum time is sufficiently longer than the maximum period. In this way, even in a case in which the maximum period extends, the battery management system 1 can be operated as a measurement system in which battery exhaustion does not occur. The battery management system 1 shown in FIG. 1 is an example of a case in which the battery life of the battery 201 included in each sensor device 20 is conceived as being "one year", and a maximum period in which the battery 201 can be replaced is conceived as being "2 years" of the interval of the maintenance operation, and the number of sensor devices 20 installed at the same position in facilities is "3".

In battery management system 1 shown in FIG. 1, for example, in a case in which the maximum period in which the battery 201 can be replaced is short such as a case in which the interval of the maintenance operation is "one year" or a case in which the replacement of the battery 201 can be sequentially performed, the number of sensor devices 20 installed at the same position may be decreased (for example, "two"). On the other hand, in the battery management system 1 shown in FIG. 1, in a case in which, as a battery 201 installed in each sensor device 20, for example, a battery that can suppress the cost of the battery to be very low such as a battery available in the market is employed, by installing sensor devices 20 corresponding to a number for which the short battery life can be sufficiently supplemented at the same position in the facilities, as described above, a measurement system corresponding to the IIoT in which battery exhaustion does not occur for a necessary period or more can be realized. In such a case, in the battery management system 1, the number of sensor devices 20 installed at the same position is conceived as being large. However, since the cost of batteries that are available in the market is lowered nonlinearly, the degree of easiness in the design or the manufacture of the sensor devices 20 and a decrease in the cost of batteries according to the use of batteries available in the market are conceived to be more effective than an increase in the cost accompanying with an increase in the number of sensor devices 20 to be installed. For this reason, in the battery management system 1, even in a case in which the maximum period, in which the battery 201 installed in the sensor device 20 cannot be replaced, is long, a very-low priced battery can employed, and accordingly, a plant corresponding to the IIoT can be realized more easily.

In the battery management system 1 described above, a configuration has been described in which the sensor manager 202 of the sensor device 20 is actively operated for every predetermined constant time, for example, for every 24 hours or the like, and the battery remaining amount information representing the remaining amount of the battery 201 is output (transmitted) to the battery manager 101. In the case of such a configuration, even the sensor device 20 of which the operation is controlled to be stopped consumes at least the battery 201 when the battery remaining amount information is output (transmitted) to the gateway device 10 (the battery manager 101). However, in the battery management system 1, the battery manager 101 changes the process of switching the sensor device 20 to be operated, and accordingly, the sensor device 20 of which the operation is controlled to be stopped does not output (transmit) the battery remaining amount information to the battery manager 101, whereby the consumption of the battery 201 can be further decreased.

<Modified Example of Process>

In a case in which the sensor device 20 does not output (transmit) the battery remaining amount information to the battery manager 101, the processing sequence of the process of switching a sensor device 20 to be operated using the gateway device 10 (more specifically, the battery manager 101) will be described as a process of a modifies example of the first embodiment. Also in the process of the modified example of the first embodiment, the configuration of the battery management system 1, in other words, the configuration of the gateway device 10 and the sensor device 20 is the same as the configuration of the battery management system 1 according to the first embodiment shown in FIG. 1. Thus, detailed description of the configuration of a battery management system 1 performing a process according to the modified example of the first embodiment will not be described.

In the process of the modified example of the first embodiment, in the sensor device 20, similar to the description presented above, the sensor manager 202 does not output (transmit) battery remaining amount information to the battery manager 101 by actively being operated for every constant time predetermined. Thus, in the process of the modified example of the first embodiment, the radio interface 203 included in each sensor device 20 is not operated for every constant time predetermined. However, in the process of the modified example of the first embodiment, the radio interface 203 included in the sensor device 20, of which the operation is controlled to be stopped, stops the operation in a state waiting for reception such that operation control information output (transmitted) by the battery manager 101 through the radio communication 30 can be received. A function of the radio interface 203 for stopping the operation in a state waiting for reception can be realized using an existing radio technology. Accordingly, in the process of the modified example of the first embodiment, detailed description of a system in which the radio interface 203 stops the operation in a state waiting for reception will not be presented.

Figure 3:
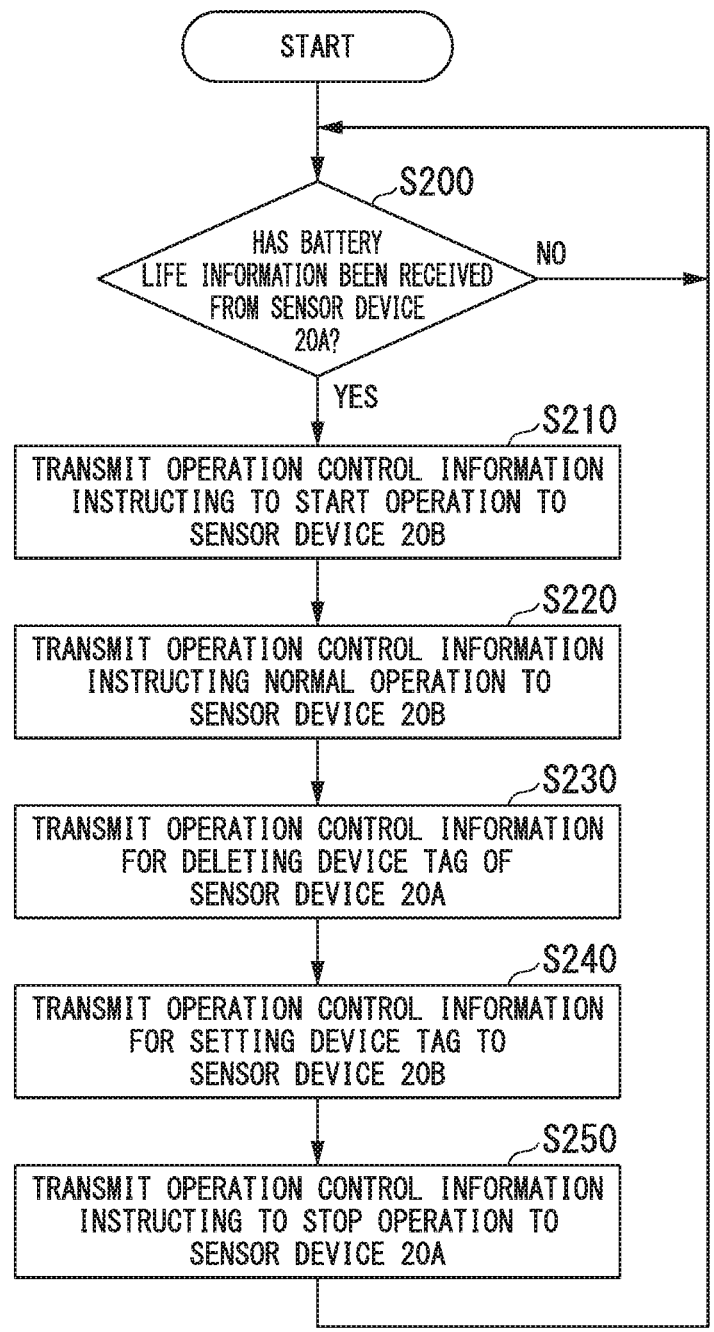
FIG. 3 is a flowchart showing an example of the processing sequence of a process of changing a field device according to a modified example in the battery management device according to the first embodiment of the present invention.

FIG. 3 is a flowchart showing an example of the processing of the process of the modified example in the battery management device according to the first embodiment of the present invention, that is, the battery manager 101 included in the gateway device 10 changes the field device, in other words, the sensor device 20. Also in the process of the modified example of the first embodiment shown in FIG. 3, similar to the process of the first embodiment shown in FIG. 2, an example of the process of switching of the sensor device 20 to perform a normal operation from the sensor device 20A to the sensor device 20B using the battery manager 101 included in the gateway device 10 is shown. In other words, also in the process of the modified example of the first embodiment shown in FIG. 3, the process of switching the sensor device 20 to perform a normal operation from the sensor device 20A to the sensor device 2013 using the battery manager 101 when approaching the battery life of the battery 201A installed in the sensor device 20A performing a normal operation is shown.

Also in the following description, similar to the processing sequence using the battery manager 101 shown in FIG. 2, three sensor devices 20 including the sensor device 20A, the sensor device 20B, and the sensor device 20C shown in FIG. 1 are assumed to be already connected to the gateway device 10 through provisioning in a state being installed at the same position in facilities and are defined as sensor devices 20 belonging to the same group. Furthermore, also in the following description, similar to the processing sequence using the battery manager 101 shown in FIG. 2, it is assumed that the battery manager 101 identifies the three sensor devices 20 including the sensor device 20A, the sensor device 20B, and the sensor device 20C using device IDs and sets a device tag only in the sensor device 20 currently performing a normal operation (in other words, device tags of sensor devices 20 of which the operations are controlled to be stopped are not set). Also in the following description, similar to the processing sequence using the battery manager 101 shown in FIG. 2, a state is assumed in which the battery manager 101 included in the gateway device 10 already has controlled the sensor device 20A to perform a normal operation and controls the sensor device 20B and the sensor device 20C to stop the operation.

Also in the process of the modified example of the first embodiment shown in FIG. 3, similar to the process according to the first embodiment shown in FIG. 2, in the configuration of the battery management system 1 shown FIG. 1, the battery manager 101 realizing the function of the battery management device is configured inside the gateway device 10. However, also in the modified example of the first embodiment, similar to the process according to the first embodiment shown in FIG. 2, for the convenience of description, the battery manager 101 will be described to perform radio communication with each sensor device 20 through the radio communication 30 and output (transmit) the operation control information to each sensor device 20.

Also the process of switching a sensor device 20 using the battery manager 101 shown in FIG. 3, similar to the process of switching the sensor device 20 using battery manager 101 shown in FIG. 2, is started when the battery manager 101 is operated.

When the battery manager 101 starts the process of switching the sensor device 20, similar to Step S100 of the process according to the first embodiment shown in FIG. 2, it is determined whether or not battery life information output (transmitted) from the sensor device 20A has been received (Step S200). In a result of the determination of Step S200, in a case in which battery life information has not been received from the sensor device 20A ("NO" in Step S200), similar to Step S100 of the process according to the first embodiment shown in FIG. 2, the process is returned to Step S200, and the battery manager 101 waits for reception of the battery life information from the sensor device 20A.

On the other hand, as a result of the determination of Step S200, in a case in which the battery life information has been received from the sensor device 20A ("YES" in Step S200), the battery manager 101, similar to Step S100 of the process according to the first embodiment shown in FIG. 2, determines to switch the sensor device 20 to perform a normal operation from the sensor device 20A.

The battery manager 101 outputs (transmits) operation control information used for operating sensor devices 20B, of which the operation is controlled to be stopped, belonging to the same group as that of the sensor device 20A through the radio communication 30 (Step S210).

When the sensor device 20B is operated, the battery manager 101, similar to Step S120 of the process according to the first embodiment shown in FIG. 2, outputs (transmits) operation control information instructing the sensor device 20B to perform a normal operation to the sensor device 20B through the radio communication 30 (Step S220). The battery manager 101, similar to Step S130 of the process according to the first embodiment shown in FIG. 2, outputs (transmits) operation control information used for deleting the device tag to the sensor device 20A through the radio communication 30 (Step S230). The battery manager 101, similar to Step S130 of the process according to the first embodiment shown in FIG. 2, may output ((transmit) operation control information used for setting the same device tag (for example, "stopped sensor" or the like) as that of the sensor device 20 of which the operation is controlled to be stopped to the sensor device 20A in Step S230.

Subsequently, in a case in which a normal operation instructed to the sensor device 20B is received, similar to Step S140 of the process according to the first embodiment shown in FIG. 2, the battery manager 101 outputs (transmits) operation control information used for setting a device tag representing a sensor device 20 to perform a normal operation to the sensor device 20B through the radio communication 30 (Step S240). In this way, the sensor device 20B starts an operation as the sensor device 20 performing a normal operation in the battery management system 1. When the device tag of the sensor device 20A is deleted, similar to Step S150 of the process according to the first embodiment shown in FIG. 2, the battery manager 101 outputs (transmits) operation control information used for controlling the sensor device 20A to stop the operation to the sensor device 20A through the radio communication 30 (Step S250). In this way, the sensor device 20A becomes the sensor device 20 of which the operation is controlled to be stopped in the battery management system 1.

Similar to the process according to the first embodiment shown in FIG. 2, when the operation of the sensor device 20A is controlled to be stopped in Step S250, or after the operation of the sensor device 20A is controlled to be stopped, the battery manager 101 may perform control such that the sensor device 20A does not output (transmit) the battery remaining amount information to the battery manager 101. Similar to the process according to the first embodiment shown in FIG. 2, the battery manager 101, after controlling the operation of the sensor device 20A to be stopped in Step S250, may notify that the battery life of the battery 201A of the sensor device 20A is approaching by outputting (transmitting) information representing that the switching of the sensor device 20 has been performed to the host system 50 through the field network 40.

Thereafter, similar to the process according to the first embodiment shown in FIG. 2, the process is returned to Step S200, and the battery manager 101 repeats the determination of whether or not battery life information representing approach to the battery life of the battery 201B installed in the sensor device 20B controlled such that it performs a normal operation has been received. When the battery life information representing approach to the battery life of the battery 201B has been received from the sensor device 20B performing a normal operation, the battery manager 101, similar to the description presented above, operates the sensor device 20C in Step S210 and performs the processes of Steps S220 to S250 and switches the sensor device 20 to perform a normal operation from the sensor device 20B to the sensor device 20C.

In the sensor device 20A of which the operation is controlled to be stopped in Step S250, similar to the description of the process according to the first embodiment shown in FIG. 2, the installed battery 201A is replaced, and the battery manager 101 controls the sensor device 20A to perform a normal operation again.

According to the process of such a modified example, in the battery management system 1, similar to the process according to the first embodiment shown in FIG. 2, when approaching the battery life of the battery 201 installed in any one of sensor devices 20, which perform normal operations, belonging to the same group, the battery manager 101 included in the gateway device 10 switches the operation of another sensor device 20, of which the operation is stopped for suppressing the consumption of the battery 201, belonging to the same group to a normal operation.

In this way, in the battery management system 1, also according to the process of the modified example, among a plurality of sensor devices 20 belonging to the same group, only one sensor device 20 is caused to perform a normal operation, and the operations of the remaining sensor devices 20 are controlled to be stopped to suppress the consumption of the battery 201. In this way, in the battery management system 1, also according to the process of the modified example, a plurality of sensor devices 20 can be viewed as one sensor device 20 from the host system 50, a measurement value can be output (transmitted) to the host system 50 without the measurement value being deficient in accordance with the battery exhaustion of the battery 201 installed in the sensor device 20.

In addition, in the process of the modified example in the battery management system 1, each sensor device 20 of which the operation is stopped is not operated for every predetermined constant time. More specifically, in the process according to the first embodiment shown in FIG. 2, although each sensor device 20 of which the operation is stopped is operated, for example, at the interval of once for every 24 hours, in the process of the modified example of the battery management system 1, each sensor device 20 of which the operation is stopped is not operated until the battery life (for example, one year) of the battery 201A installed in the sensor device 20A performing a normal operation is approaching. For this reason, in the process of the modified example of the battery management system 1, the consumption of the battery 201 installed in each sensor device 20 of which the operation is stopped can be reduced to be lower than that of the process according to the first embodiment shown in FIG. 2.

In the battery management system 1 according to the first embodiment of the present invention, a case has been described in which each sensor device 20 is configured to include the sensor 205. However, depending on facilities disposed in the plant, there are also cases in which a plurality of sensor devices 20 cannot be disposed at the same position. For example, a plurality of sensors measuring a flow rate or pressure is assumed not to be installed at the same position in facilities. In such a case, in order to drive the sensors using a battery, a battery having a large capacity of a high cost is assumed to be necessary. However, the concept of the present invention can be applied as such also to such a case, and accordingly, a decrease in the size (a decrease in the capacity) and a decrease in the cost of the battery can be realized.

Second Embodiment

Next, a second embodiment of the present invention will be described. A battery management system according to the second embodiment (hereinafter, referred to as "battery management system 2") is a battery management system having a configuration in which a plurality of field devices of a battery-driven type share one sensor (a measurement unit or an operation unit) in a case in which a plurality of sensor devices 20 according to the first embodiment cannot be installed at the same position in the facilities. Also in the following description, similar to the battery management device according to the first embodiment, an example of a case will be described in which the battery management device according to the second embodiment of the present invention manages batteries installed in three sensor devices configured as the field devices of a battery-driven type. Constituent elements configuring the battery management system 2 include constituent elements that are similar to the constituent elements configuring the battery management system 1 according to the first embodiment including the battery management device according to the first embodiment shown in FIG. 1. Thus, in the following description, in the battery management system 2 according to the second embodiment, the same reference sign will be assigned to the same constituent element as the constituent element of the battery management system 1 according to the first embodiment, and detailed description of the constituent elements will not be presented.

Figure 4:
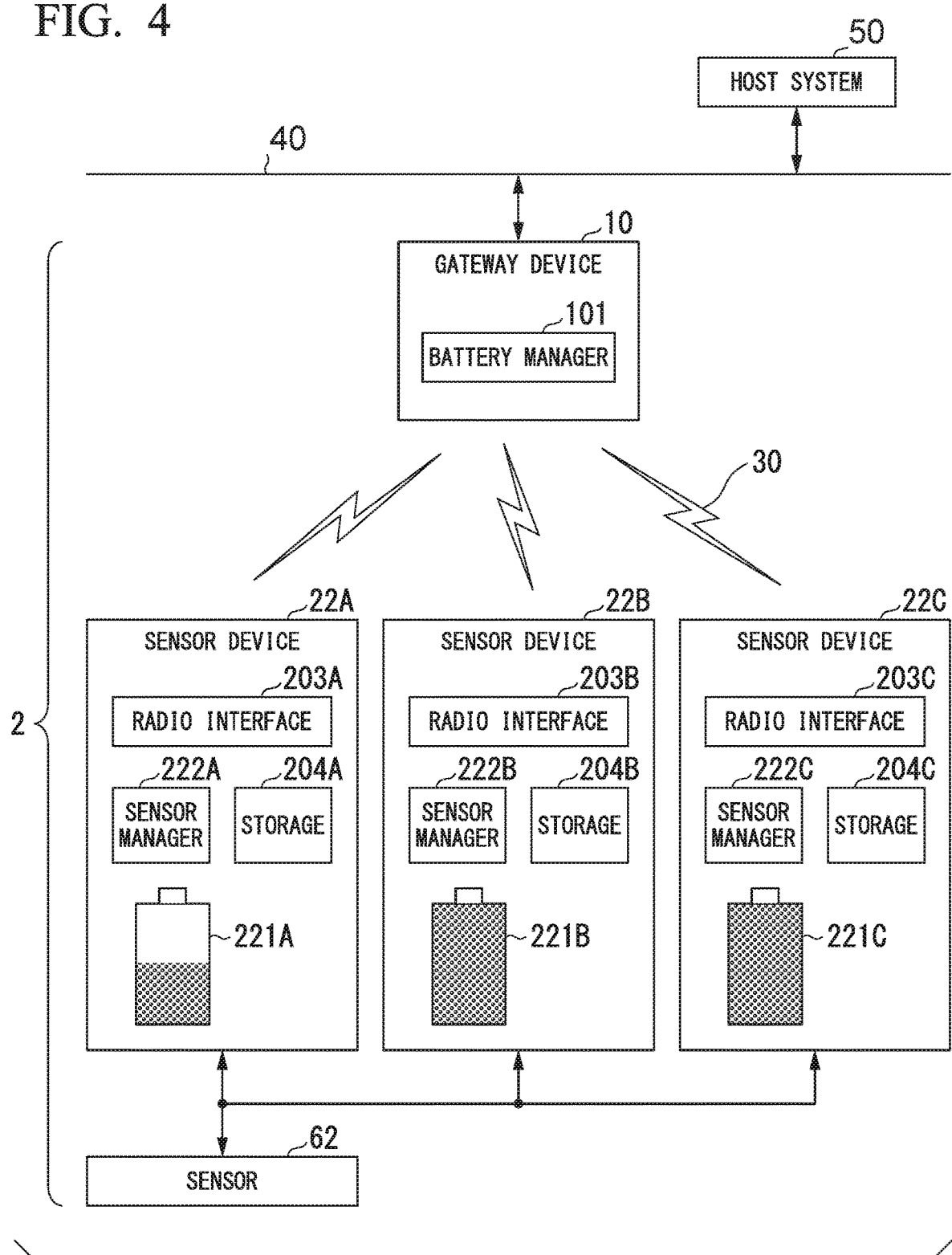
FIG. 4 is a block diagram showing a schematic configuration of a battery management device according to a second embodiment of the present invention and a schematic configuration of a battery management system according to the second embodiment including field devices managed by the battery management device.

FIG. 4 is a block diagram showing a schematic configuration of a battery management device according to the second embodiment of the present invention and a schematic configuration of a battery management system 2 according to the second embodiment including field devices (sensor devices) managed by the battery management device. The battery management system 2 includes a gateway device 10, three sensor devices including a sensor device 22A, a sensor device 22B, and a sensor device 22C; and a sensor 62. In the following description, in a case in which the three sensor devices including the sensor device 22A, the sensor device 22B, and the sensor device 22C are represented without being distinguished from each other, each thereof will be referred to as a "sensor device 22".

Similar to the battery management system 1 according to the first embodiment shown in FIG. 1, FIG. 4 shows the battery management system 2 having a configuration in which the battery management device according to the second embodiment of the present invention is configured as a gateway device 10, and the gateway device 10 is connected to three sensor devices 22 that are targets for the management of batteries using the battery management device through radio communication 30. Similar to the battery management system 1 according to the first embodiment shown in FIG. 1, FIG. 4 additionally shows a host system 50 that exchanges (transmits and receives) data such as measurement values acquired by the battery management system 2 from the sensor devices 22 through a field network 40.

The sensor 62 is a sensor that is disposed in facilities disposed in a plant and detects a predetermined physical quantity (analog quantity) at a position in the installed facilities. The sensor 62, for example, is a flow rate sensor detecting a flow rate in the facilities or a pressure sensor detecting a pressure in the facilities. The sensor 62 outputs a signal representing the detected physical quantity to the sensor device 22A, the sensor device 22B, and the sensor device 22C. The sensor 62 is not limited to the flow rate sensor or the pressure sensor descried above, and any one of various sensors detecting various physical quantities in the facilities may be considered.

Each of the sensor device 22A, the sensor device 22B, and the sensor device 22C is a field device of a battery-driven type installed in facilities disposed in the plant. Here, each of the sensor device 22A, the sensor device 22B, and the sensor device 22C, different from the sensor device 20 according to the first embodiment, does not include a sensor that detects a predetermined physical quantity and is combined with the common sensor 62 to configure a field device (measurement device) similar to the sensor device 20 according to the first embodiment. Each of sensor device 22A, the sensor device 22B, and the sensor device 22C outputs (transmits) a measurement value that is detected and output by the common sensor 62 to the gateway device 10 through the radio communication 30 in a normal operation.

The sensor device 22 includes a battery 221, a sensor manager 222, a radio interface (I/F) 203, and a storage 204. Also in FIG. 4, similar to the sensor device 20 shown in FIG. 1, in order to distinguish the constituent elements described above included in the sensor device 22A, the sensor device 22B, and the sensor device 22C, "A", "B", or "C" that is a part of the reference sign of the sensor device 22A, the sensor device 22B, or the sensor device 22C is assigned after a "number" of a reference sign of each constituent element.

Each constituent element included in the sensor device 22 includes a constituent element that is similar to a corresponding constituent element included in the sensor device 20 shown in FIG. 1. More specifically, in the constituent elements included in the sensor device 22, except that the battery 201 and sensor manager 202 included in the sensor device 20 are replaced with the battery 221 and the sensor manager 222 in accordance with the replacement of the sensor 205 included in the sensor device 20 with the common sensor 62 disposed outside, the function and the operation of each of the constituent elements are similar to those of a corresponding constituent element included in the sensor device 20. Thus, in the following description, in the constituent elements of the sensor device 22, the same reference sign will be assigned to a constituent element similar to the constituent element of the sensor device 20, and detailed description of the constituent elements will not be presented, and only constituent elements of the sensor device 22 that are different from those of the sensor device 20 and operations thereof will be described. In the following description, for the convenience of description, a configuration including the sensor 62 that is appropriately combined with the sensor device 22 will be described as the sensor device 22.

The battery 221, similar to the battery 201 installed in the sensor device 20, is a small-size battery supplying power to each constituent element included in the sensor device 22. Here, the battery 221 supplies power also to the combined external sensor 62 in addition to the constituent elements included in the sensor device 22.

The sensor manager 222, similar to the sensor manager 202 installed in the sensor device 20, is a controller that controls all the sensor devices 22. The sensor manager 222 calculates a measurement value representing a physical quantity that is detected and output by the combined external sensor 62 and outputs data of the calculated measurement value to the gateway device 10 through the radio communication 30 by outputting the data to the radio interface 203. At this time, the sensor manager 222, similar to the sensor manager 202 installed in the sensor device 20, outputs information of a device ID stored in the storage 204 to the radio interface 203 together with the calculated measurement value, and outputs (transmits) the information to the gateway device 10 through the radio communication 30. In this way, the gateway device 10 that has received a measurement value output (transmitted) through the radio communication 30 can recognize a specific sensor device 22 from which the measurement value representing a physical quantity detected by the sensor 62 has been calculated and output (transmitted) on the basis of the information of the device ID output (transmitted) together with the data of the measurement value. In the present invention, a method of calculating a measurement value representing a physical quantity output from the sensor 62 using the sensor manager 222 is not particularly defined.

The sensor manager 222 controls the supply of power from the battery 221 to each constituent element included in the sensor device 22 and the external sensor 62 in accordance with operation control information used for controlling the operation (running) of the sensor device 22 that is output (transmitted) from the battery management device through the radio communication 30 and is output from the radio interface 203. More specifically, the sensor manager 222 included in the sensor device 22 controlled such that it performs a normal operation from the battery management device connects the battery 221 and the radio interface 203, the storage 204, and the external sensor 62 and performs control such that the battery 221 supplies power to each of the constituent elements. On the other hand, the sensor manager 222 included in the sensor device 22 controlled to stop the operation from the battery management device blocks a connection between the battery 221 and the radio interface 203, the storage 204, and the external sensor 62 and suppresses the consumption of the battery 221 by performing control such that the battery 221 does not supply power to each of the constituent elements.

The other functions of the sensor manager 222 are similar to those of the sensor manager 202 included in the sensor device 20. Thus, detailed description of the other functions of the sensor manager 222 and the operations thereof will not be presented.

In the battery management system 2, each of the sensor device 22A, the sensor device 22B, and the sensor device 22C operates as one sensor device 22. More specifically, in the battery management system 2, each of a combination of the sensor device 22A and the sensor 62, a combination of the sensor device 22B and the sensor 62, and a combination of the sensor device 22C and the sensor 62 operates a combination of one sensor device 22 and the sensor 62. For this reason, also in the battery management system 2, the sensor device 22A, the sensor device 22B, and the sensor device 22C are defined as sensor devices 22 belonging to the same group, and the operation (running) of each of the sensor device 22A, the sensor device 22B, and the sensor device 22C is controlled by the battery management device. In the battery management system 2, the battery management device is similar to the battery management device according to the first embodiment. In other words, also in the battery management system the battery manager 101 is included in the gateway device 10 as a constituent element for realizing the function of the battery management device according to the second embodiment. For this reason, also in the battery management system 2, similar to the battery management system 1 according to the first embodiment, in accordance with the control of the battery management device, only one sensor device 22 among the sensor device 22A, the sensor device 22B, and the sensor device 22C is controlled such that it performs a normal operation, and the remaining sensor devices 22 are controlled such that they are brought into a standby (sleep) state in which the operation thereof is stopped. For this reason, also in the battery management system 2, similar to the battery management system 1 according to the first embodiment, only one sensor device 22 among the sensor device 22A, the sensor device 22B, and the sensor device 22C controlled such that it performs a normal operation by the battery management device outputs (transmits) a measurement value representing a physical quantity detected and output by the sensor 62 to the gateway device 10 through the radio communication 30. Also in the battery management system 2, similar to the battery management system 1 according to the first embodiment, the consumption of batteries 221 installed in the remaining sensor devices 22 controlled to stop the operation by the battery management device is reduced.

Thus, in the battery management system 2, a method of controlling the operation (running) of the sensor device 22A, the sensor device 22B, and the sensor device 22C using the battery management device and the processes thereof are similar to those of the battery management system 1 according to the first embodiment. In other words, also in the battery management system 2, the battery manager 101 included in the gateway device 10 controls the operation (running) of the sensor device 22 similar to the switching process of the sensor device 20 according to the first embodiment shown in FIG. 2 and the modified example of the switching process of the sensor device 20 according to the first embodiment shown in FIG. 3. More specifically, also in the battery management system 2, before approaching the battery life of the battery 221 installed in the sensor device 22 that currently performs a normal operation, the battery manager 101 included in the gateway device 10 stops the operation of the sensor device 22 performing the normal operation and switches the sensor device to another sensor device 22, in which the consumption of the battery 221 is reduced, belonging to the same group. Thus, in the battery management system 2, detailed description of the method of controlling the operation (running) of each of the sensor devices 22 using the battery management device and the processes thereof will not be presented.

In this way, also in the battery management system 2, similar to the battery management system 1 according to the first embodiment, the battery manager 101 included in the gateway device 10 controls (switches) the sensor device 22 to perform a normal operation such that only one sensor device 22 among a plurality of sensor devices 22 belonging to the same group performs the normal operation, and the operations of the remaining sensor devices are stopped to suppress the consumption of the battery 221. In this way, also in the battery management system 2, effects similar to those of the battery management system 1 can be acquired. More specifically, also in the battery management system 2, similar to the battery management system 1 according to the first embodiment, even in a case in which the battery life of the battery 221 installed in each sensor device 22 belonging to the same group is short, a measurement value representing a physical quantity detected by the sensor 205 can be output (transmitted) to the host system 50 without the measurement value being deficient. Also in the battery management system 2, similar to the battery management system 1 according to the first embodiment, the battery management system 2 is operated as a measurement system corresponding to the IIoT in which battery exhaustion does not occur for a necessary period until preventive maintenance, a regular repair, or the like is performed next time or more, whereby a plant corresponding to the IIoT can be realized.

In other words, in the battery management device according to the present invention, regardless whether or not each field device (sensor device) of a battery-driven type that is a target for managing batteries includes a sensor detecting a predetermined physical quantity, it appears that battery exhaustion does not occur in one field device (sensor device) viewed from the host system 50 until preventive maintenance or a regular repair is performed next time.

In the first embodiment and the second embodiment, the configurations and the operations of the battery management devices and the battery management systems managing batteries installed in the field devices (sensor devices) of a battery-driven type have been described. However, the concept of the present invention can be applied to a plant other than the management of batteries. For example, also in a case in which a failure occurs in a sensor included in a sensor device, by considering the switching of a sensor device to be operated to be similar to the switching of batteries, the concept of the present invention may be applied to the switching of a sensor to detect a physical quantity.

Third Embodiment

Next, a third embodiment of the present invention will be described. The battery management system according to the third embodiment (hereinafter, referred to as "battery manage management system 3") is a battery management system having a configuration in which a function handling a failed sensor is added to the function of managing batteries in which the battery management device according to the present invention is realized in the battery management system 1 according to the first embodiment or the battery management system 2 according to the second embodiment. In the following description, an example of a case will be described in which the battery management system 3 according to the third embodiment adds a function handling a failed sensor to the battery management system 1 according to the first embodiment.

Also in the battery management system 3 according to the third embodiment, a battery management device according to the third embodiment of the present invention, similar to the battery management device according to the first embodiment, manages batteries installed in three sensor devices that are field devices of a battery-driven type detecting predetermined physical quantities using sensors. In addition, in the battery management system 3 according to the third embodiment, the battery management device according to the third embodiment of the present invention performs handling when a failure occurs in a sensor included in each sensor device. More specifically, in the battery management system 3 according to the third embodiment, the battery management device according to the third embodiment of the present invention switches a sensor device to perform a normal operation when approaching the battery life of the battery installed in the sensor device or when failure occurs in a sensor included in the sensor device.

Constituent elements configuring the battery management system 3 include constituent elements that are similar to the constituent elements configuring the battery management system 1 according to the first embodiment including the battery management device according to the first embodiment shown in FIG. 1. Thus, in the following description, in the battery management system 3 according to the third embodiment, the same reference sign will be assigned to the same constituent element as the constituent element of the battery management system 1 according to the first embodiment, and detailed description of the constituent elements will not be presented.

Figure 5:
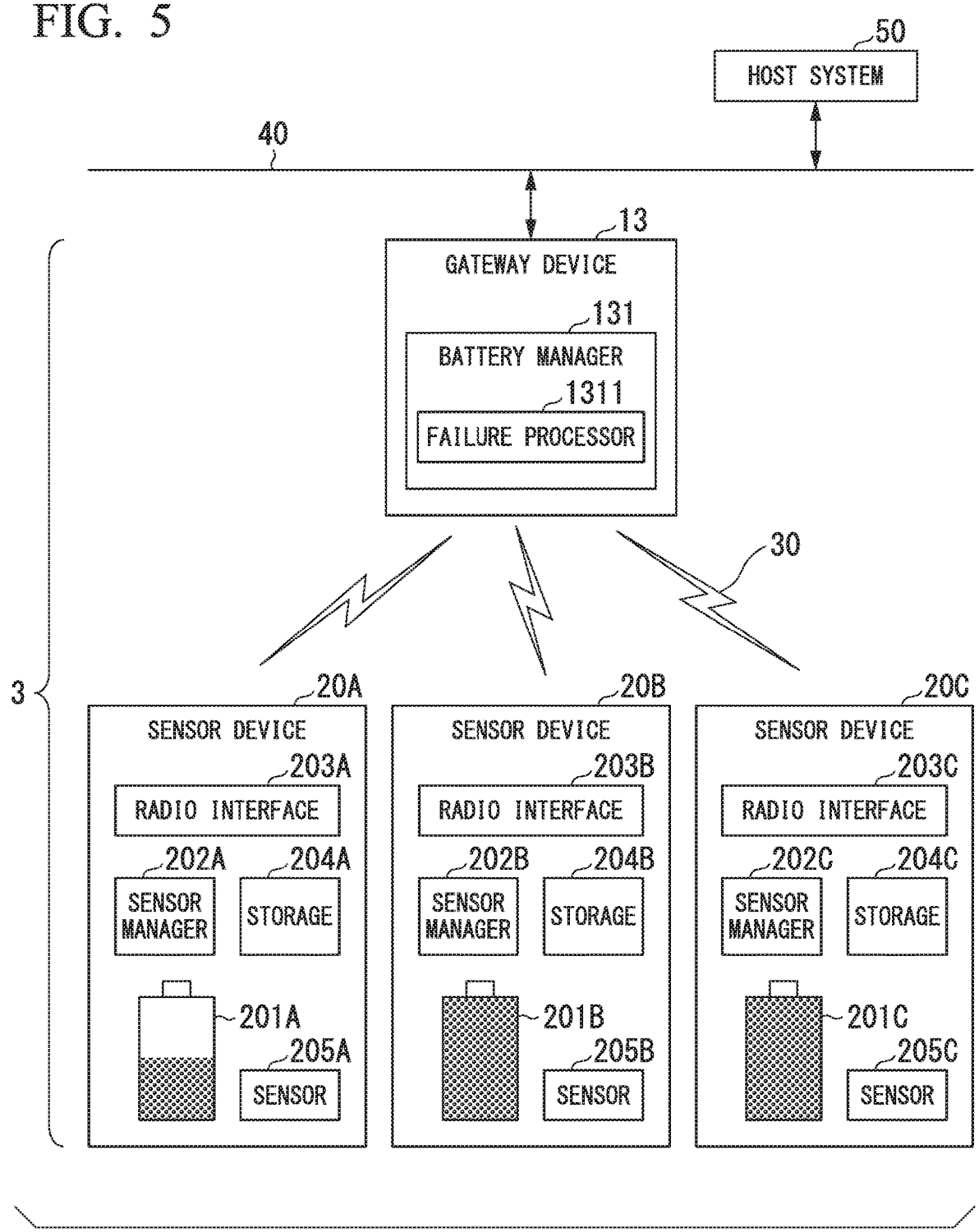
FIG. 5 is a block diagram showing a schematic configuration of a battery management device according to a third embodiment of the present invention and a schematic configuration of a battery management system according to the third embodiment including field devices managed by the battery management device.

FIG. 5 is a block diagram showing a schematic configuration of the battery management device according to the third embodiment of the present invention and a schematic configuration of the battery management system 3 according to the third embodiment including field devices (sensor devices) managed by the battery management device. The battery management system 3 includes a gateway device 13, and three sensor devices 20 including a sensor device 20A, a sensor device 20B, and a sensor device 20C.

Similar to the battery management system 1 according to the first embodiment shown in FIG. 1, FIG. 5 shows the battery management system 3 having a configuration in which the battery management device according to the third embodiment of the present invention is configured as the gateway device 13, and the gateway device 13 is connected to three sensor devices 20 that are targets for the management of batteries using the battery management device through radio communication 30. Similar to the battery management system 1 according to the first embodiment shown in FIG. 1, FIG. 5 additionally shows a host system 50 that exchanges (transmits and receives) data such as measurement values acquired by the battery management system 3 from the sensor devices 20 through a field network 40.

The gateway device 13, similar to the gateway device 10 configuring the battery management system 1 according to the first embodiment shown in FIG. 1, relays various kinds of information or data exchanged between a field device (a measurement device or mar operation device) connected through the radio communication 30 such as a sensor device 20, in other words, a field device (radio field device) and the host system 50 connected through the field network 40. Also in FIG. 5, a radio interface that is a constituent element performing radio communication with the field device through the radio communication 30 in the gateway device 13 and a communication interface that performs communication with the host system 50 through the field network 40 are not shown.

The gateway device 13, similar to the gateway device 10 configuring the battery management system 1, in a normal operation, transmits data of measurement values output (transmitted) from one of sensor devices 20 among the sensor devices 20 controlled such that it performs the normal operation from the battery management device through the radio communication 30 to the host system 50 through the field network 40. The gateway device 13 similar to the gateway device 10 configuring the battery management system 1, performs communication (transmission/reception) through the field network 40 using the sensor device 20 as one sensor device 20. At this time, the gateway device 13, similar to the gateway device 10, outputs (transmits) tag information (for example, information of a group tag) used for identifying a group to which the sensor device 20 that has output (transmitted) the data of measurement values through the radio communication 30 belongs to the host system 50 together with the data of the measurement value.

The gateway device 13 includes the battery manager 131 as a constituent element used for realizing the function of the battery management device. The battery manager 131, similar to the battery manager 101 included in the gateway device 10 configuring the battery management system 1 according to the first embodiment shown in FIG. 1, controls (switches) the operation (running) of each sensor device 20 on the basis of the battery life information and the battery remaining amount information output (transmitted) from each sensor device 20 belonging to the same group through the radio communication 30. In this way, also in the battery management system 3, similar to the battery management system 1 according to the first embodiment, in one sensor device 20 viewed from the host system 50, it appears that battery exhaustion does not occur until preventive maintenance or a regular repair is performed next time.

The battery manager 131 includes a failure processor 1311 as a constituent element used for realizing a function (failure processing function) handling an occurrence of a failure in the sensor 205 included in the sensor device 20. In a case in which a notification representing the occurrence of a failure in the sensor 205 included in each sensor device 20 belonging to the same group (hereinafter, referred to as "sensor failure notification") is performed, the failure processor 1311 controls (switches) the sensor device 20 to be operated (run) using the battery manager 131. More specifically, the failure processor 1311 switches a sensor device 20 in which a failure has occurred in the sensor 205 similar to when approaching the battery life of the battery 201. In this way, in the battery management system 3, even in a case in which a failure occurs in the sensor 205 included in the sensor device 20 during a constant period (for example, two years) of a maintenance operation for facilities performed in a plant, for example, preventive maintenance, a regular repair, or the like, the deficiency of the measurement value of the sensor device 20 used by the host system 50 for performing monitoring the state of the operation of each facilities disposed in a plant, control of the operation of each facilities, and the like can be reduced to be minimum.

The sensor failure notification representing the occurrence of a failure in the sensor 205 included in the sensor device 20 is output (transmitted) from the host system 50 through the field network 40. For example, in a case in which a measurement value of the sensor device 20 transmitted by the gateway device 10 is deficient for a long period in a normal operation or a case in which the measurement value markedly deviates from an assumed measurement value, the host system 50 outputs (transmits) a sensor failure notification representing the occurrence of a failure in the sensor 205 included in the sensor device 20. In the following description, the deficiency of the measurement value and a measurement value other than the assumed value described above are not differentiated, and it is assumed that deficiency of the measurement value occurs in accordance with the occurrence of a failure in the sensor 205, and the sensor failure notification is output (transmitted).

The sensor failure notification representing the occurrence of a failure in the sensor 205 included in the sensor device 20 is not limited to a configuration in which the sensor failure notification is output (transmitted) from the host system 50. For example, in a case in which the sensor 205 is determined to be failed in accordance with a failure determination function, which is not shown in the drawing, included in the sensor device 20, the sensor failure notification may be configured to be output (transmitted) from the sensor device 20 through the radio communication 30. For example, a function (failure determination function) of determining whether or not a failure has occurred in the sensor 205 included in the sensor device 20 performing a normal operation may be included in the failure processor 1311. In a case in which it is determined that a failure has occurred in the sensor 205 by the sensor device 20 or the failure processor 1311, the failure processor 1311 may output (transmit) information representing the sensor device 20 of which the sensor 205 is determined to be failed to the host system 50 through the field network 40. In this way, the host system 50 that has received the information of the failure of the sensor 205 included in the sensor device 20 output (transmitted) through the field network 40 can perform preparation necessary for perform replacement or repair of the sensor 205 included in the sensor device 20 installed in the facilities.

In the present invention, the function of determining whether or not a failure has occurred in the sensor 205 included in the sensor device 20 (failure determination function) and a method of notifying the failure processor 1311 of the occurrence of a failure in the sensor 205 are not particularly defined.

In the configuration of the battery management system 3 shown in FIG. 5, while a configuration in which the battery manager 131 is configured inside the gateway device 13 is shown, similar to the battery management system 1 according to the first embodiment shown FIG. 1, the battery manager 131 may be configured outside gateway device 13, in other words, a position parallel to the gateway device 13. In the configuration of the battery management system 3 shown in FIG. 5, although a configuration in which the failure processor 1311 is configured inside the battery manager 131 included in the gateway device 13 is shown, the failure processor 1311 may be configured outside the battery manager 131 or the outside the gateway device 13, in other words, in a position parallel to the battery manager 131.

Similar to the gateway device 10 configuring the battery management system 1 according to the first embodiment shown FIG. 1, in addition to the sensor device 20 shown in FIG. 5, various field devices (measurement devices or operation devices) may be connected to the gateway device 13 through the radio communication 30. Similar to the gateway device 10 configuring the battery management system 1, the gateway device 13 may have a function of a data collecting device that collects data output (transmitted) from a plurality of field devices connected through the radio communication 30 and outputs (transmits) the collected data to the host system 50 through the field network 40. The field devices connected to the gateway device 13 through the radio communication 30 have various configurations, and the gateway device 13, similar to the gateway device 10, manages the field devices in association with each other by performing provisioning.

Also in the battery management system 3, similar to the battery management system 1 according to the first embodiment, each of the sensor device 20A, the sensor device 20B, and the sensor device 20C operates as one sensor device 20. For this reason, also in the battery management system 3, similar to the battery management system 1 according to the first embodiment, the sensor device 20A, the sensor device 20B, and the sensor device 20C are defined as sensor devices 20 belonging to the same group, and the operation (running) of each of the sensor device 20A, the sensor device 20B, and the sensor device 20C is controlled by the battery management device (the battery manager 131). In other words, also in the battery management system 3, similar to the battery management system 1 according to the first embodiment, only one sensor device 20 controlled such that it performs a normal operation by the battery manager 131 outputs (transmits) a measurement value representing a physical quantity detected by the sensor to the gateway device 13 through the radio communication 30, and the consumption of batteries 201 installed in the remaining sensor devices 20 controlled to stop the operation by the battery manager 131 is reduced.

In the battery management system 3, a method and a process of controlling the operation (running) of each sensor device 20 using the battery manager 131 included in the gateway device 13 are similar to those of the battery management system 1 according to the first embodiment. In other words, also in the battery management system 3, similar switching process of the sensor device 20 according to the first embodiment shown in FIG. 2 and the modified example of the switching process of the sensor device 20 according to the first embodiment shown in FIG. 3, the battery manager 131 switches the sensor device 20 performing a normal operation to another sensor device 20, of which the operation is stopped, belonging to the same group before approaching the battery life of the battery 201 installed in the sensor device 20 performing the normal operation. Thus, in the battery management system 3, detailed description of the method and the process of controlling the operation (running) of each of the sensor devices 20 using the battery management device (the battery manager 131) will not be presented.

In the battery management system 3, as described above, similar to when approaching the battery life of the battery 201 installed in the sensor device 20 controlled such that it performs normal operation, by using the failure processing function (the failure processor 1311) included in the battery manager 131, the operations (running) of each sensor device 20 is controlled such that the sensor device 20 of which the sensor 205 is failed is switched to a sensor device 20 of which the sensor 205 is not failed. In other words, in the battery management system 3, in accordance with the control from the failure processor 1311 included in the battery manager 131, only the sensor device 20 of which the sensor 205 is not failed is a sensor device 20 that is a target of which the operation (running) is controlled. In this way, in the battery management system 3, in accordance with the control from the battery manager 131, only one sensor device 20 in which it is not the battery life of the battery 201, and the sensor 205 is not failed is controlled such that it performs a normal operation, and the remaining sensor devices 20 are controlled such that they are brought into a standby (sleep) state in which the operations thereof are stopped.

Figure 6:
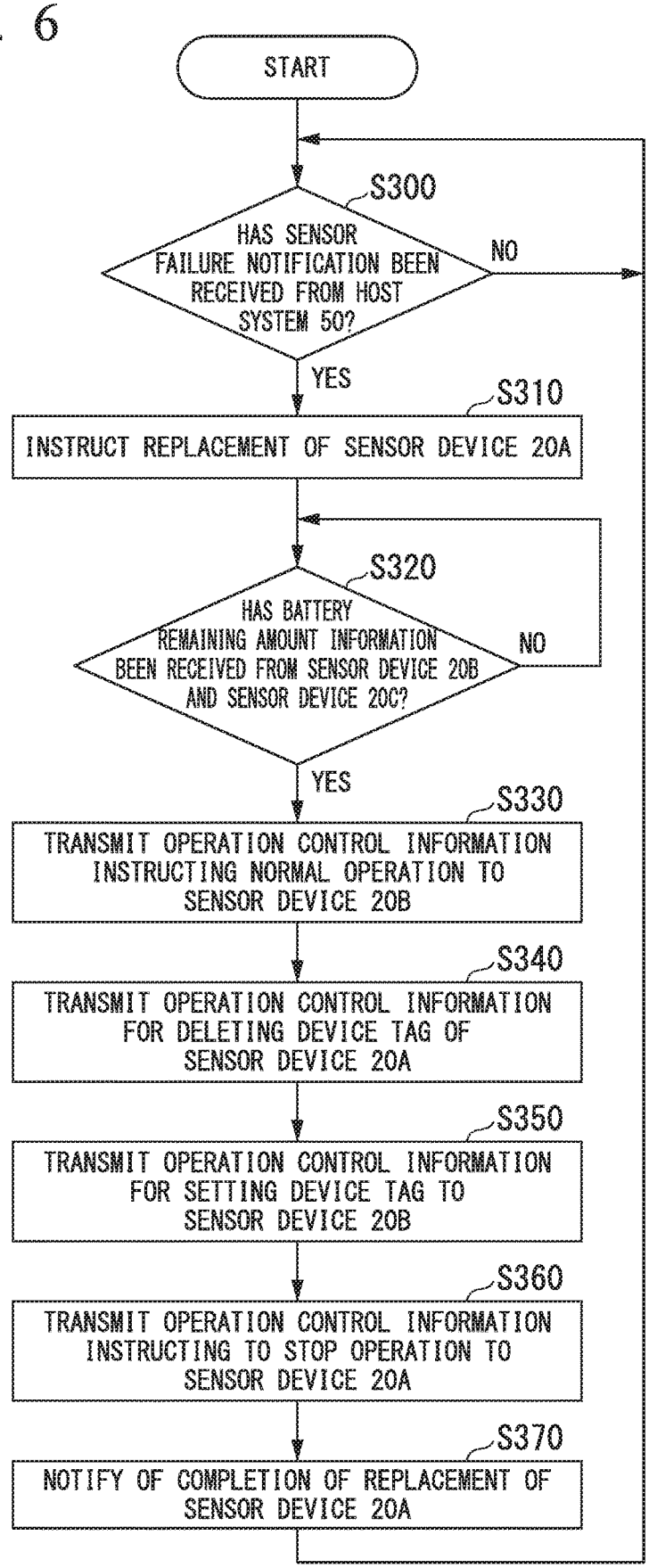
FIG. 6 is a flowchart showing an example of the processing sequence of a process of changing a field device in the battery management device according to the third embodiment of the present invention.

Next, the processing sequence of the process of switching the sensor device to be operated when a failure occurs in the sensor included in the sensor device performing a normal operation will be described. FIG. 6 is a flowchart showing an example of the processing sequence of a process of changing field device, in other words, the sensor device 20 in the battery management device according to the third embodiment (more specifically, the failure processor 1311 that is a failure processing function in the battery manager 131 included in the gateway device 13). In the following description, the host system 50 shown in FIG. 5 is assumed to output (transmit) a sensor failure notification through the field network 40.

In the following description, it is assumed that three sensor devices 20 including the sensor device 20A, the sensor device 20B, and the sensor device 20C shown in FIG. 5 are installed at the same position of facilities, are already connected to the gateway device 13 through the radio communication 30 using provisioning, and are defined as sensor devices 20 belonging to the same group. In the following description, it is assumed that the battery manager 131 and the failure processor 1311 identify the three sensor devices 20 including the sensor device 20A, the sensor device 20B, and the sensor device 20C using device IDs and sets a device tag only in the sensor device 20 performing a normal operation (in other words, device tags of sensor devices 20 of which the operations are controlled to be stopped are not set). In the following description, a state is assumed in which the battery manager 131 included in the gateway device 13 already has controlled the sensor device 20A to perform a normal operation and controls the sensor device 20B and the sensor device 20C to stop the operations.

Also in the configuration of the battery management system 3 shown in FIG. 5, similar to the battery management system 1 according to the first embodiment shown in FIG. 1, the battery manager 131 realizing the function of the battery management device is configured inside the gateway device 13. In the configuration of the battery management system 3 shown in FIG. 5, the failure processor 1311 realizing a failure processing function is configured inside the battery manager 131 included in the gateway device 13. For this reason, the battery manager 131 and the failure processor 1311 are configured to control the operation (running) of each sensor device 20 through the radio interface, which is not shown in the drawing, included in the gateway device 13 and the radio communication 30. In addition, the battery manager 131 and the failure processor 1311 are configured to perform wired or wireless communication with the host system 50 through the communication interface, which is not shown in the drawing, included in the gateway device 13 and the field network 40. However, in the following description, for the convenience of description, the battery manager 131 and the failure processor 1311 will be described to perform radio communication for exchanging operation control information, battery life information, battery remaining amount information, and the like with each sensor device 20 through the radio communication 30 and to perform wired communication of a sensor failure notification and the like with the host system 50 through the field network 40.

FIG. 6 shows an example of a process of switching from a sensor device 20A of which the sensor 205 is failed to a sensor device 20B of which the sensor 205 is not failed using the failure processor 1311 provided in the battery manager 131 included in the gateway device 13 at a timing of the switching process of the sensor device 20 in the first embodiment shown in FIG. 2 in a case in which a failure occurs in the sensor 205A included in the sensor device 20A performing a normal operation. In other words, the switching process of a sensor device 20 using the battery manager 131 shown in FIG. 6 is a process of switching the sensor device 20 to perform a normal operation from the sensor device 20A to the sensor device 20B due to the occurrence of a failure in the sensor 205 although it is not the battery life of the battery 201A installed in the sensor ice 20A performing the normal operation.

The switching process of a sensor device 20 using the failure processor 1311 shown in FIG. 6 is started when the battery manager 131 and the failure processor 1311 are started to be operated.

When the failure processor 1311 starts the switching process of a sensor device 20, first, it is determined whether or not a sensor failure notification representing the occurrence of a failure in the sensor 205A included in the sensor device 20A currently performing the normal operation has been received from the host system 50 (Step S300). As a result of the determination of Step S300, in a case in which the sensor failure notification has not been received from the host system 50, in other words, a failure has not occurred in the sensor 205A included in the sensor device 20A ("NO" in Step S300), the process is returned to Step S300, and the failure processor 1311 waits for reception of a sensor failure notification from the host system 50.

On the other hand, as a result of the determination of Step S300, in a case in which the sensor failure notification has been received from the host system 50, in other words, a failure has occurred in the sensor 205 included in the sensor device 20A ("YES" in Step S300), the failure processor 1311 determines to switch the sensor device 20 to perform a normal operation from the sensor device 20A. The failure processor 1311 outputs an instruction representing the replacement of the sensor device 20A to the battery manager 131 (Step S310).

In this way, similar to Step S110 of the process according to the first embodiment shown in FIG. 2, the battery manager 131 determines whether or not battery remaining amount information has been received from the sensor device 20B and the sensor device 20C, of which operations are controlled to be stopped, belonging to the same group as that of the sensor device 20A (Step S320). As a result of the determination of Step S320, in a case in which the battery remaining amount information has not been received from any one of the sensor device 20B and the sensor device 20C (none of the sensor device 20B and the sensor device 20C are at an operation timing) ("NO" in Step S320), similar to Step S110 of the process according to the first embodiment shown in FIG. 2, the process is returned to Step S320, and the battery manager 131 waits for the reception of battery remaining amount information from any one of the sensor device 20B and the sensor device 20C.

On the other hand, as a result of the determination of Step S320, in a case in which the battery remaining amount information has been received from any one of the sensor device 20B and the sensor device 20C (one of the sensor device 20B and the sensor device 20C is at an operation timing) ("YES" in Step S320), similar to Step S110 of the process according to the first embodiment shown in FIG. 2, the battery manager 131 controls the sensor device 20 that has output (transmitted) the battery remaining amount information representing the remaining amount of the battery 201 is sufficient to perform a normal operation. In the switching process of a sensor device 20 shown in FIG. 6, similar to the process according to the first embodiment shown in FIG. 2, the sensor device 20B is caused to perform a normal operation, the sensor device 20C is caused to be maintained as it is, in other words, the sensor device 20B is operated instead of the sensor device 20A of which the sensor 205A is failed, and the operation of the sensor device 20A of which the sensor 205A is failed is controlled to be stopped.

The battery manager 131, similar to Step S120 of the process according to the first embodiment shown in FIG. 2, outputs (transmits) operation control information instructing a normal operation to the sensor device 20B through the radio communication 30 (Step S330). The battery manager 31, similar to Step S130 of the process according to the first embodiment shown in FIG. 2, outputs (transmits) operation control information used for deleting a device tag to the sensor device 20A through the radio communication 30 (Step S340). The battery manager 131, similar to Step S130 of the process according to the first embodiment shown in FIG. 2, may output (transmit) operation control information used for setting the same device tag example, "stopped sensor" or the like) as that of the sensor device 20 of which the operation is controlled to be stopped to the sensor device 20A in Step S340.

Subsequently, when the normal operation instructed to the sensor device 20B is received, similar to Step S140 of the process according to the first embodiment shown in FIG. 2, the battery manager 131 outputs (transmits) operation control information used for setting a device tag representing the sensor device 20 performing the normal operation to the sensor device 20B through the radio communication 30 (Step S350). In this way, the sensor device 20B in the battery management system 3, starts an operation as the sensor device 20 performing the normal operation. When the device tag of the sensor device 20A is deleted, similar to Step S150 of the process according to the first embodiment shown in FIG. 2, the battery manager 131 outputs (transmits) operation control information used for controlling the operation to be stopped to the sensor device 20A through the radio communication 30 (Step S360). In this way, the sensor device 20A becomes the sensor device 20 of which the operation is controlled to be stopped in the battery management system 3.

Similar to the process according to the first embodiment shown in FIG. 2, when controlling the operation of the sensor device 20A to be stopped in Step S360 or after controlling the operation of the sensor device 20A to be stopped, the battery manager 131 may control the sensor device 20A not to output (transmit) battery remaining amount information to the battery manager 101. Similar to the process according to the first embodiment shown in FIG. 2, after controlling the operation of the sensor device 20A to be stopped in Step S360, the battery manager 131 may notify of the replacement of the sensor device 20A of which the sensor 205A is failed by outputting (transmitting) information representing the switching of the sensor device 20 to the host system 50 through the field network 40.

Thereafter, the battery manager 131 outputs a notification representing the completion of replacement of the sensor device 20A to the failure processor 1311 (Step S370).

In this way, the process is returned to Step S300, and the failure processor 1311 repeats the determination of reception of a sensor failure notification representing the occurrence of a failure in the sensor 205B included in the sensor device 20B performing a normal operation from the host system 50. A sensor failure notification representing the occurrence of a failure in the sensor 205B included in the sensor device 20B performing a normal operation is received, the failure processor 1311, similar to the description presented above, switches (replaces) the sensor device 20B of which the sensor 205B is failed to the sensor device 20C by performing the processes of Steps S310 to S370.

The sensor device 20A of which the operation is controlled to be stopped in Step S360 due to the occurrence of a failure in the sensor 205A, similar to when the battery 201A installed in the sensor device 20A is replaced with a new battery 201A, for example, replaces or repairs the sensor 205A when a maintenance operation such as preventive maintenance or a regular repair is performed. In this way, in the battery management system 3, as described above, when a failure occurs in the sensor 205 included in another sensor device 20 (for example, the sensor 205C included in the sensor device 20C), the failure processor 1311 and the battery manager 131 can control the sensor device 20A to perform a normal operation again.

A timing at which the replacement or the repair of the sensor 205A included in the sensor device 20A is performed and the process and the sequence after the replacement or the repair of the sensor 205A are similar to those when the battery 201A installed in the sensor device 20A is replaced with a new battery 201A. In other words, a timing at which the replacement or the repair of the sensor 205A included in the sensor device 20A is performed is not limited to the timing of the maintenance operation described above and, for example, may be when another operation is necessary in the facilities in which the sensor device 20A is installed or an arbitrary timing after a notification representing the replacement of the sensor device 20A using the battery manager 131 is received by the host system 50. In addition, in a case in which the position at which the sensor device 20A to the sensor device 20C are installed is in an explosion-protection zone (an explosion-protection area) or the like, even in a case in which a connection between the sensor device 20A and the gateway device 13 is interrupted, similar to when the battery 201A installed in the sensor device 20A is replaced with a new battery 201A, a connection with the gateway device 13 through the radio communication 30 can be resumed without newly performing the process of provisioning, a certain setting for the sensor device 20A, or the like.

According to the configuration and the process described above, when a failure occurs in a sensor 205 included in any one of sensor devices 20, which performs a normal operation, belonging to the same group, the battery manager 131 (including the failure processor 1311) included in the gateway device 13 in the battery management system 3 switches the sensor device 20 in which a failure occurs in the sensor 205 to another sensor device 20 belonging to the same group of which the operation is stopped to suppress the consumption of the battery 201, similar to the switching of the operation of the sensor device 20 for which the battery life of the battery 201 is approaching.

In the switching process of a sensor device 20 using the battery manager 131 and the failure processor 1311 shown in FIG. 6 similar to the process according to the first embodiment shown in FIG. 2, a case has been described in which the battery manager 131 determines whether or not the battery remaining amount information has been received and performs the process of switching a sensor device 20 to perform a normal operation (the processes of Step S320 to S360). However, the switching process of a sensor device 20 using the battery manager 131 and the failure processor 1311 is not limited to the process similar to the process of the first embodiment shown in FIG. 2 but may be a process similar to the process of the modified example of the first embodiment shown in FIG. 3. The processing sequence of such a case can be easily conceived on the basis of the switching process of a sensor device 20 using the battery manager 131 shown in FIG. 6, and thus detailed description thereof will not be presented here.

In this way, also in the battery management system 3, similar to the battery management system 1 according to the first embodiment, the battery manager 131 included in the gateway device 13 controls (switches) the sensor device 20 performing a normal operation such that, among a plurality of sensor devices 20 belonging to the same group, only one sensor device 20 is caused to perform a normal operation, and the operations of the remaining sensor devices 20 are controlled to be stopped to suppress the consumption of the battery 201. In this way, also in the battery management system 3, effects similar to those of the battery management system 1 according to the first embodiment can be acquired. More specifically, also in the battery management system 3, similar to the battery management system 1 according to the first embodiment, even in a case in which the battery life of the battery 201 installed in each sensor device 20 belonging to the same group is short, a measurement value representing a physical quantity detected by the sensor 205 can be output (transmitted) to the host system 50 without the measurement value being deficient. In the battery management system 3, similar to the battery management system 1 according to the first embodiment, a plurality of sensor devices 20 can be viewed as one sensor device 20 from the host system 50, and accordingly, a plant supporting the IIoT in which battery exhaustion does not occur for a period necessary until preventive maintenance, a regular repair, or the like is performed next time or more can be realized more easily without changing the configuration of the host system 50 to support the IIoT.

In addition, in the battery management system 3, even in a case in which a failure occurs in the sensor 205 included in the sensor device 20 performing a normal operation, the sensor device 20 performing the normal operation can be switched to (replaced with) a sensor device 20 in which the sensor 205 is not failed belonging to the same group. In this way, in the battery management system 3, the deficiency of the measurement value due to the occurrence of a failure in the sensor 5 included in the sensor device 20 performing a normal operation can be reduced to be minimum.

As described above, according to an embodiment of the present invention, the battery management device configuring the battery management system defines a plurality of field devices of a battery-driven type installed at the same position in facilities disposed in a plant as field devices belonging to the same group and performs control such that only one of the field device performs a normal operation, and the remaining field devices are in a standby (sleep) state in which the operations thereof are stopped. According to an embodiment of the present invention, before it is the battery life of the battery installed in the field device currently performing a normal operation, the battery management device performs switching such that any one field device, which suppresses the consumption of the battery by stopping operation, belonging to the same group performs the normal operation. In other words, in an embodiment of the present invention, the battery management device replaces a field device, in which it is the battery life of the battery, currently performing the normal operation with another field device in which it is not the battery life. In this way, in an embodiment of the present invention, the battery management device manages the replacement of batteries installed in field devices of a battery-driven type.

In this way, in an embodiment of the present invention, even in a case in which the battery life of a battery in a field device, for example, is shorter than a constant period of a maintenance operation for facilities performed in a plant such as preventive maintenance or a regular repair, in the case of being viewed from the host system, it appears that battery exhaustion of the field device does not occur until the preventive maintenance, the regular repair, or the like is performed next time, and the battery management system can be operated as a measurement system which battery exhaustion does not occur. In this way, in an embodiment of the present invention, for example, a very low-priced battery having a short battery life can be employed as a battery installed in each field device, decreases in the size and the cost of each field device are realized, and a plant corresponding to the IIoT in which battery exhaustion of the field device does not occur can be realized more easily.

In an embodiment of the present invention, a configuration has been shown in which a device ID and a device tag are defined, and, for example, the battery manager 101 included in the gateway device 10 realizing the function of the battery management device identifies sensor devices 20 belonging to the same group using device IDs, and the operations of the sensor devices 20 are managed (switched) using the device tags. In an embodiment of the present invention, a configuration has been shown in which a group tag is defined, and, for example, the gateway device 10 outputs (transmits) the group tag to the host system 50 together with the data of measurement values output (transmitted) from the sensor device 20 performing the normal operation, and accordingly, the host system 50 can view a plurality of sensor devices 20 as one sensor device 20. However, a method of identifying each of a plurality of field devices installed at the same position in the facilities and a method allowing the host system to view the plurality of field devices installed at the same position as one field device are not limited to methods using device IDs, device tags, and group tags represented embodiments of the present invention, and the concept of the present invention can be applied to any method as long as the object of each method can be realized by the method.

In an embodiment of the present invention, in the battery management system 3 according to the third embodiment, a case has been described in which a method of switching a field device using the battery management device managing batteries installed in field devices of a battery-driven type is applied as a method of switching (replacing) the field device (the sensor device 20) in a case in which a failure occurs in a sensor (the sensor 205), which is a functional unit for realizing the function of the sensor device 20, included in the field device (the sensor device 20). However, the method of switching a field device using the battery management device according to the present invention, similar to batteries or sensors shown in the embodiments of the present invention, may be applied and employed as a method responding to various constituent elements (functional units) for which replacement or repairs accompanying switching of a field device is necessary or various situations in a plant.

For example, by recording a program for realizing processes (a battery management method) using constituent elements for realizing the function of the battery management device such as the battery manager 101 included in the gateway device 10 shown in FIG. 1 and the battery manager 131 (including the failure processor 1311) included in the gateway device 13 shown in FIG. 5 on a computer-readable recording medium and causing a computer system to read and execute the program recorded on this recording medium, the various processes described above relating to the battery management device according to this embodiment may be performed. The "computer system" described here may include an OS and hardware such as peripherals. In a case in which a WWW system is used, the "computer system" is assumed to include a home page providing environment (or display environment). The "computer-readable recording medium" represents a storage device such as a writable non-volatile memory including a flexible disc, a magneto-optical disk, a ROM, and a flash memory, a portable medium such as a CD-ROM, or a hard disk or the like built in a computer system.

Furthermore, the "computer-readable recording medium" includes a medium storing a program for a fixed time such as a volatile memory (for example, a dynamic random access memory (DRAM)) disposed in a computer system that becomes a server or a client in a case in which a program is transmitted through a network such as the internet or a communication line such as a telephone line. The program described above may be transmitted from a computer system storing this program in a storage device or the like to another computer system through a transmission medium or a transmission wave in a transmission medium. The "transmission medium" transmitting a program represents a medium having an information transmitting function such as a network (communication network) including the Internet and the like or a communication circuit line (communication line) including a telephone line. The program described above may be used for realizing a part of the functions described above. In addition, the program described above may be a program realizing the functions described above by being combined with a program recorded in the computer system in advance, a so-called a differential file (differential program).

While embodiments of the invention have been described and shown above, it should be understood that specific constituents are not limited to these embodiments. Various modifications can be made without departing from the spirit or scope of the present invention.

What is claimed is:

1. A battery management device for managing a plurality of field devices of a battery-driven type, the plurality of field devices being associated with a facility disposed in a plant and being configured to detect a predetermined physical quantity of the same kind to each other in the facility, the plurality of field devices comprising a first field device currently operating and a second field device of which an operation is stopped, the battery management device comprising:
   at least one memory storing instructions, and
   at least one processor configured to execute the instructions to:
   operate the second field device and stop an operation of the first field device in a case receiving from the first field device battery life information representing that an amount of consumption of an installed battery is larger than an amount of consumption set in advance.

2. The battery management device according to claim 1, wherein
   the at least one processor is configured to execute the instructions to:
   identify each of the plurality of field devices on the basis of identification information exclusively assigned to the plurality of field devices; and
   change tag information stored in a storage of each of the plurality of field devices, the tag information identifying a field device currently operating and a field device of which an operation is stopped.

3. The battery management device according to claim 2, wherein
the at least one processor is configured to execute the instructions to:
change first tag information set in the first field device to be in a same state as that of second tag information set in the second field device and change the second tag information set in the second field device to be in a same state as that of the first tag information set in the first field device.

4. The battery management device according to claim 3, wherein
the at least one processor is configured to execute the instructions to:
after starting the second field device, change the second tag information to be in a same state as that of the first tag information.

5. The battery management device according to claim 4, wherein
the at least one processor is configured to execute the instructions to:
transmit to the second field device operation control information used for starting the second field device to start the second field device.

6. The battery management device according to claim 3, wherein
the at least one processor is configured to execute the instructions to:
in a case of receiving battery remaining amount information representing a remaining amount of the installed battery from the second field device after receiving the battery life information from the first field device change the second tag information to be in a same state as that of the first tag information.

7. The battery management device according to claim 6, wherein
the at least one processor is configured to execute the instructions to:
receive the battery remaining amount information from each of a plurality of second field devices of which an operation is stopped; and
change tag information set in flail the second field device which has transmitted the battery remaining amount information representing the remaining amount higher than a predetermined value to be in a same state as that of the first tag information.

8. The battery management device according to claim 6, wherein
the at least one processor is configured to execute the instructions to:
prevent the first field device from transmitting the battery remaining amount information after stopping the operation of the first field device.

9. The battery management device according to claim 1, wherein
the at least one processor is configured to execute the instructions to:
instruct replacement of the first field device in a case in which a failure occurs in a functional unit used for realizing a function of the first field device and included in the first field device.

10. The battery management device according to claim 1, wherein
the plurality of field devices are installed at a same position in the facility.

11. A battery management system comprising:
a plurality of field devices of a battery-driven type, the plurality of field devices being associated with a facility disposed in a plant and being configured to detect a predetermined physical quantity of the same kind to each other in the facility, the plurality of field devices comprising a first field device currently operating and a second field device of which an operation is stopped; and
a battery management device for managing the plurality of field devices, comprising:
at least one memory storing instructions, and
at least one processor configured to execute the instructions to:
operate the second field device and stop an operation of the first field device in a case receiving from the first field device battery life information representing that an amount of consumption of an installed battery is larger than an amount of consumption set in advance.

12. The battery management system according to claim 11, wherein
the battery management device is a relay device transmitting information or data output from the field device currently operating to a host system built in the plant using all the plurality of field devices as one field device.

13. The battery management system according to claim 11, wherein
the plurality of field devices are installed at a same position in the facility.

14. The battery management system according to claim 11, wherein
the second field device starts at predetermined fixed time intervals and transmits battery remaining amount information representing a remaining amount of the installed battery to the battery management device.

15. The battery management system according to claim 14, wherein
the at least one processor is configured to execute the instructions to:
operate the second field device and stop the operation of the first field device in a case of receiving the battery remaining amount information from the second field device after receiving the battery life information from the first field device.

16. The battery management system according to claim 11, wherein
the at least one processor is configured to execute the instructions to:
transmit to the second field device operation control information used for starting the second field device to start the second field device after receiving the battery life information from the first field device.

17. The battery management system according to claim 11, wherein
each of the plurality of field devices comprises a sensor for detecting physical quantities of the facility.

18. The battery management system according to claim 11, further comprising:
a sensor that detects physical quantities of the facility and transmits the detected physical quantities to each of the plurality of field devices.

19. A battery management method for managing a plurality of field devices of a battery-driven type, the plurality of field devices being associated with a facility disposed in a plant and being configured to detect a predetermined physical quantity of the same kind to each other in the facility, the plurality of field devices comprising a first field device currently operating and a second field device of which an operation is stopped, the battery management method comprising:

operating the second field device and stopping an operation of the first field device in a case receiving from the first field device battery life information representing that an amount of consumption of an installed battery is larger than an amount of consumption set in advance.

20. The battery management device according to claim 1, wherein the at least one processor is configured to execute the instructions to:

operate the second field device and stop the operation of the first field device in a case of receiving the battery life information from the first field device and receiving battery remaining amount information representing a remaining amount of an installed battery from the second field device that actively operates at predetermined fixed time intervals.

21. The battery management device according to claim 1, wherein in a case receiving the battery life information from the first field device and receiving battery remaining amount information representing a remaining amount of an installed battery from the second field device that actively operates at predetermined fixed time intervals, the at least one processor is configured to execute the instructions to:

transmit, to the second field device that has transmitted the battery remaining amount information representing the remaining amount higher than a predetermined value, operation control information instructing to perform a normal operation;

transmit, to the first field device, operation control information used for causing the first field device to delete tag information representing a field device performing a normal operation;

transmit, to the second field device, operation control information used for setting the tag information; and transmit, to the first field device, operation control information used for controlling the first field device to stop the operation.

* * * * *